US012067692B2

(12) United States Patent
Burns et al.

(10) Patent No.: US 12,067,692 B2
(45) Date of Patent: Aug. 20, 2024

(54) SYSTEMS AND METHODS FOR IMAGE CAPTURE CALIBRATION

(71) Applicant: Immersive Tech, Inc., Lewisville, TX (US)

(72) Inventors: Micheal Woodrow Burns, Sarasota, FL (US); Jon Clagg, Tampa, FL (US); Kunal Bansal, Tampa, FL (US)

(73) Assignee: Immersive Tech, Inc., Lewisville, TX (US)

( * ) Notice: Subject to any disclaimer, the term of this patent is extended or adjusted under 35 U.S.C. 154(b) by 455 days.

(21) Appl. No.: 17/246,206

(22) Filed: Apr. 30, 2021

(65) Prior Publication Data

US 2021/0375000 A1    Dec. 2, 2021

Related U.S. Application Data

(60) Provisional application No. 63/033,762, filed on Jun. 2, 2020.

(51) Int. Cl.
*G06T 3/00* (2006.01)
*G06T 3/12* (2024.01)
(Continued)

(52) U.S. Cl.
CPC .................. *G06T 3/12* (2024.01); *G06T 5/20* (2013.01); *G06T 5/80* (2024.01); *G06T 7/80* (2017.01)

(58) Field of Classification Search
CPC ......... G06T 3/0062; G06T 5/006; G06T 5/20; G06T 7/80
See application file for complete search history.

(56) References Cited

U.S. PATENT DOCUMENTS 5,796,426 A    8/1998    Gullichsen et al.
6,369,818 B1 *    4/2002    Hoffman .................. G06T 15/20
345/427

(Continued)

OTHER PUBLICATIONS

Asari et al., "A New Approach for Nonlinear Distortion Correction in Endoscopic Images Based on Lease Square Estimation," IEEE Transactions on Medical Imaging, Apr. 1999, vol. 18, No. 4, pp. 345-354.

(Continued)

*Primary Examiner* — Molly Wilburn
(74) *Attorney, Agent, or Firm* — KPPB LLP

(57) ABSTRACT

Systems and methods in accordance with various embodiments of the invention can generate term (or PolyMap) coefficients that properly calibrate any camera lens using information obtained from a calibration pattern (e.g., chessboard patterns). Term coefficients in accordance with several embodiments of the invention can be used to transform a warped image to a dewarped image by mapping image information from the warped image to the dewarped coordinates. Determining calibration coefficients in accordance with certain embodiments of the invention can include novel and inventive processes for capturing calibration images, processing the calibration images, and/or deriving inputs needed for proper calibration as described in this disclosure. Processes described in this description can provide for improvements in the field of image processing, especially in increasing the speed of dewarping processes and in the accurate capture of calibration pattern images.

20 Claims, 24 Drawing Sheets

(51) Int. Cl.
  *G06T 5/00* (2006.01)
  *G06T 5/20* (2006.01)
  *G06T 5/80* (2024.01)
  *G06T 7/80* (2017.01)

(56) References Cited

U.S. PATENT DOCUMENTS

| | | | |
|---|---|---|---|
| 7,623,677 | B2 | 11/2009 | Girgensohn et al. |
| 9,699,465 | B2 | 7/2017 | Ouedraogo et al. |
| 9,928,393 | B1 | 3/2018 | Barnum |
| 9,936,249 | B1 | 4/2018 | Nelson et al. |
| 10,402,781 | B2 | 9/2019 | Terwilliger et al. |
| 10,839,568 | B2 | 11/2020 | Ashok et al. |
| 10,986,337 | B2 | 4/2021 | Burns et al. |
| 11,196,929 | B2 | 12/2021 | Okiyama et al. |
| 11,734,789 | B2 | 8/2023 | Burns et al. |
| 2006/0280376 | A1 | 12/2006 | Lei |
| 2007/0025636 | A1 | 2/2007 | Furukawa et al. |
| 2007/0188633 | A1 | 8/2007 | Mandy et al. |
| 2015/0334398 | A1 | 11/2015 | Socek et al. |
| 2016/0019428 | A1 | 1/2016 | Renner et al. |
| 2016/0065946 | A1 | 3/2016 | Cole et al. |
| 2016/0323561 | A1 | 11/2016 | Jin et al. |
| 2017/0118540 | A1 | 4/2017 | Thomas et al. |
| 2017/0199099 | A1 | 7/2017 | Chen et al. |
| 2018/0199024 | A1 | 7/2018 | Yip |
| 2019/0102868 | A1* | 4/2019 | Beric .................... G06T 5/006 |
| 2019/0222823 | A1 | 7/2019 | Clagg et al. |
| 2019/0259124 | A1 | 8/2019 | Barnett |
| 2021/0058616 | A1 | 2/2021 | Burns et al. |
| 2021/0374921 | A1 | 12/2021 | Burns et al. |

OTHER PUBLICATIONS

Bogner et al., "Photographic lenses projections: computational models, correction, conversion . . . ," Projection models, printed from michael.thoby.free.fr/Fisheye_history_short/Projections/Fisheye_projection-models.html, 6 pgs.

Bourke, "Omni-directional Stereoscopic Fisheye Images for Immersive Hemispherical Dome Environments," Computer Games and Allied Technology, 2009, 6 pgs.

Bye, "NextVR and the Future of Immersive Sports Live-Streaming," Retrieved from https://www.roadtovr.com/nextvr-future-immersive-sports-live-streaming/, Apr. 3, 2016, 3 pages.

Chang et al., "Rectangling Stereographic Projection for Wide-Angle Image Visualization," Proceedings of the IEEE International Conference on Computer Vision, 2013, 8 pgs.

Gunkel et al., "WebVR Meets WebRTC: Towards 360-Degree Social VR Experiences," In Virtual Reality (VR), IEEE, 2017, pp. 457-458.

Hughes et al., "Review of Geometric Distortion Compensation in Fish-Eye Cameras," ISSC Jun. 18-19, 2008, Galway, 6 pages.

Hughes et al., "Validation of Polynomial-based Equidistance Fish-Eye Models," ISSC, Jun. 10-11, 2009, UCD, 6 pgs.

Keselman, "What's the best lens for stereo? An exploration of lens models and their stereoscopic depth performance," Stanford University, Published in 2016, 8 pgs.

Kheng, "Image Warping and Morphing, CS5245 Vision & Graphics for Special Effects," May 14, 2014, 31 pgs.

Konrad et al., "SpinVR: Towards Live-Streaming 3D Virtual Reality Video," ACM Transactions on Graphics (TOG) vol. 36, No. 6, Article 208, Nov. 2017, 12 pgs., https://doi.org/10.1145/3130800.3130836.

Lang, "NextVr's Latest Tech is Bringing New Levels of Fidelity to VR Video," Retrieved from https://www.roadtovr.com/nextvr-latest-tech-is-bringing-new-levels-of-fidelity-to-vr-video/, Published Feb. 8, 2018, Printed Jan. 3, 2019, 6 pgs.

Liu et al., "Automatic Image Retargeting with Fisheye-View Warping," UIST 2005, Oct. 23-27, 2005, 10 pgs.

Liu et al., "Critical Assessment of Correction Methods for Fisheye Lens Distortion," The international Archives of the Photogrammetry, Remote Sensing and Spatial Information Sciences, Jul. 12-19, 2016, vol. XLI-B1, XXIII ISPRS Congress, pp. 221-228.

Ma et al., "A Family of Simplified Geometric Distortion Models for Camera Calibration," arXiv:cs/0308003 [cs.CV], Aug. 12, 2003, 14 pgs.

Moynihan, "The NFL's New VR Highlights Take Football to a Whole New Level," Retrieved from https://www.wired.com/2016/12/nextvr-nfl-game-highlights/, published Dec. 11, 2016, printed Jan. 3, 2019, 14 pgs.

Pereira, "Calibration of Catadioptric Vision Systems," Thesis, Jul. 2012, 104 pgs.

Prins et al., "TogetherVR: A Framework for Photo-Realistic Shared Media Experiences in 360-Degree VR," TNO, The Netherlands, IBC 2017, 8 pgs.

Rhody, "Lecture 17: Geometric Image Transformations," Chester F. Carlson for Imaging Science, Rochester Institute of Technology, Nov. 11, 2004, 39 pgs.

Rowell, "Calibrating a VR Camera," IEEE Consumer Electronics Society, Jun. 2015, 24 pgs.

Sarconi, "3-D TV Tech Finally Finds Good Use Streaming NBA Action in Virtual Reality," Retrieved from https://www.wired.com/2017/04/nextvr-nba/, published Apr. 15, 2017, printed Jan. 3, 2019, 11 pgs.

Schneider et al., "On the Accuracy of Dense Fisheye Stereo," IEEE Robotics and Automation Letters 1, No. 1, 2016, 8 pgs.

Vass et al., "Applying and removing lens distortion in post production," Colorfront Ltd., 2003, 8 pgs.

Wang et al., "Fisheye live streaming: A study of the dewarping function and the performance of the streaming," Thesis, 2018, 66 pgs.

Sahin et al., "Distortion optimization for wide-angle computational cameras", Optics Express 26.5 (2018): 5478-5487.

Yang et al., "Correct a particular fisheye lens distortion quickly using the coordinate map table", International Conference on Image Processing and Pattern Recognition in Industrial Engineering, 2010.

* cited by examiner

205

210

215

220

224

SYSTEMS AND METHODS FOR IMAGE CAPTURE CALIBRATION

CROSS-REFERENCE TO RELATED APPLICATIONS

The current application claims priority to U.S. Provisional Patent Application Ser. No. 63/033,762, entitled "Systems and Methods for Image Distortion Correction", filed Jun. 2, 2020. The disclosure of Application Ser. No. 63/033,762 is hereby incorporated by reference in its entirety.

FIELD OF THE INVENTION

The present invention generally relates to image capture calibration and, more specifically, image capture calibration for dewarping images captured with wide angle lenses.

BACKGROUND

Fisheye lenses have many features and qualities that distinguish them from each other. Professional photographers and videographers take great care in the selection of the proper lens for various situations. Since the curvature of the lens, the eccentricity, any astigmatisms due to manufacturing defects, the field of view, and many other factors come into play when performing a fisheye to equirectangular mapping, the shapes of these fisheye lenses are highly variable. Each of their measurable parameters requires accommodations to be made for proper fisheye dewarping.

One of the most significant parameters that need to be accounted for in a fisheye lens is the radial distortion factor. The standard fisheye lens dewarping algorithm presumes a linear radial distortion factor across the field of view (FOV) of the lens. This means that the same Euclidean distance between two points (moving radially away from the center) corresponds to the same angle across the FOV, regardless of the distance from the center. This assumption is not valid with many types of fisheye lenses. For lenses that do not have a linear radial distortion factor, the standard methods of fisheye correction cannot be used without including a separate computational process that describes the radial distortion for a particular radial distance as measured from the center of the fisheye image. The algorithm to correct for fisheye distortion naturally becomes more complex for these lenses. This also means that it takes longer for the graphics processing unit (GPU) to compute a complete pixel mapping for an image. This also results in a significant (non-trivial) increase in the computational load on the GPU.

In many embodiments, fisheye dewarping can be performed using a PolyMap method. In the PolyMap method of fisheye dewarping, a set of 18 coefficients are used in a pair of polynomial functions $X(x,y)$ and $Y(x,y)$. The PolyMap process delivers a 98-fold increase in computational speed. This effect is even more pronounced when there is a non-linear radial distortion on the lens being corrected. There is no difference between the algorithms needed to provide linear or nonlinear radial distortion corrections when using the PolyMap. The only differences are in the specific values of the 18 PolyMap coefficients. The PolyMap process computes in the same amount of time, regardless of what those coefficients are. It is also applicable to lenses of every type and can deliver the necessary accommodations regardless of any of the intrinsic qualities or features of a specific lens. Since there is no difference in computational time for any lens when using the PolyMap dewarping process, it is well suited to dewarping lenses with nonlinear radial distortion factors.

SUMMARY OF THE INVENTION

Systems and methods for image capture calibration in accordance with embodiments of the invention are illustrated. One embodiment includes a method for image capture calibration. The method includes steps for identifying a set of real source keypoints from a real source image of a calibration pattern, computing a set of ideal source keypoints based on the set of real source keypoints, identifying ideal destination keypoints based on the ideal source keypoints, adding boundary keypoints to the set of real source keypoints and the set of ideal destination keypoints, and determining a set of term coefficients based on a mapping of the real source keypoints to the ideal destination keypoints.

In a further embodiment, identifying the set of real source keypoints includes capturing the real source image by determining whether a calibration pattern is present in a first image, when the calibration pattern is present in the first image, identifying and evaluating a position of the calibration pattern within the source image, when the position of the calibration pattern meets a set of criteria, identifying the first image as the real source image.

In still another embodiment, determining whether the calibration pattern is present in the first image comprises identifying several regions of interest (ROIs), computing a histogram for each ROI of the several ROIs, and determining that the calibration pattern is present when a strongly separated dense bimodal distribution is detected.

In a still further embodiment, identifying and evaluating a position of the calibration pattern includes identifying an amount of at least one selected from the group consisting of skew, tilt, and centeredness.

In yet another embodiment, computing the set ideal source keypoints comprises determining a scale for the source image, scaling coordinates for the set of real source keypoints based on the determined scale, determining a set of geodesics based on the scaled coordinates, and identifying intersects of the set of geodesics as ideal source keypoints.

In a yet further embodiment, determining the scale for the source image includes identifying a pixel distance from a center of the real source image to a 180° field of view (FOV), wherein scaling the coordinates for the set of real source keypoints includes dividing the coordinates by the identified pixel distance.

In another additional embodiment, determining the set of geodesics includes identifying geodesics along two axes, wherein each geodesic passes through a real source keypoint and a pair of points on a 180° field of view (FOV) boundary.

In a further additional embodiment, identifying intersects comprises identifying intersects in a first quadrant of the real source image, and reflecting the identified intersects of the first quadrant to at least one other quadrant.

In another embodiment again, adding boundary points comprises selecting a set of boundary points at a boundary of an equirectangular destination image for the destination keypoints, and identifying a corresponding set of boundary points at a 180° field of view (FOV) boundary for the real source keypoints.

In a further embodiment again, identifying a corresponding set of boundary points includes performing a Reverse PolyMap operation with affine transformation.

One embodiment includes a non-transitory machine readable medium containing processor instructions for image capture calibration, where execution of the instructions by a processor causes the processor to perform a process that comprises identifying a set of real source keypoints from a real source image of a calibration pattern, computing a set of ideal source keypoints based on the set of real source keypoints, identifying ideal destination keypoints based on the ideal source keypoints, adding boundary keypoints to the set of real source keypoints and the set of ideal destination keypoints, and determining a set of term coefficients based on a mapping of the real source keypoints to the ideal destination keypoints.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Systems and methods in accordance with various embodiments of the invention can generate term (or PolyMap) coefficients that properly calibrate any camera lens using information obtained from a calibration pattern (e.g., chessboard patterns). Term coefficients in accordance with several embodiments of the invention can be used to transform a warped image to a dewarped image by mapping image information from the warped image to the dewarped coordinates. Determining calibration coefficients in accordance with certain embodiments of the invention can include novel and inventive processes for capturing calibration images, processing the calibration images, and/or deriving inputs needed for proper calibration as described in this disclosure. Processes described in this description can provide for improvements in the field of image processing, especially in increasing the speed of dewarping processes and in the accurate capture of calibration pattern images.

This document describes four novel processes that are used to generate PolyMap (or term) coefficients customized to a specific camera for proper fisheye to equirectangular mapping. Polymap coefficients are described in U.S. patent application Ser. No. 17/244,701, entitled "Systems and Methods for Image Distortion Correction", filed Apr. 29, 2021, the disclosure of which is incorporated by reference herein in its entirety. Term coefficients in accordance with many embodiments of the invention can be used to quickly and efficiently dewarp images captured using a given lens. In several embodiments, term coefficients can be derived from the observed distortion of a lens (e.g., a fisheye lens) as measured by the coordinates of keypoints of a calibration pattern (e.g., corners of a checkerboard pattern).

Systems and methods in accordance with some embodiments of the invention can provide for capturing and processing the detected keypoints of a calibration pattern. In numerous embodiments, the FOV of a camera can be automatically detected to generate a set of idealized keypoints. In a variety of embodiments, a reversed PolyMap calculation can be used to compute coordinates in a dewarped image (or destination image) associated with keypoints from a warped image (or source image). In several embodiments, term (or PolyMap) coefficients can be calculated specific to a particular camera lens by using a source image of a calibration pattern.

Figure 1:
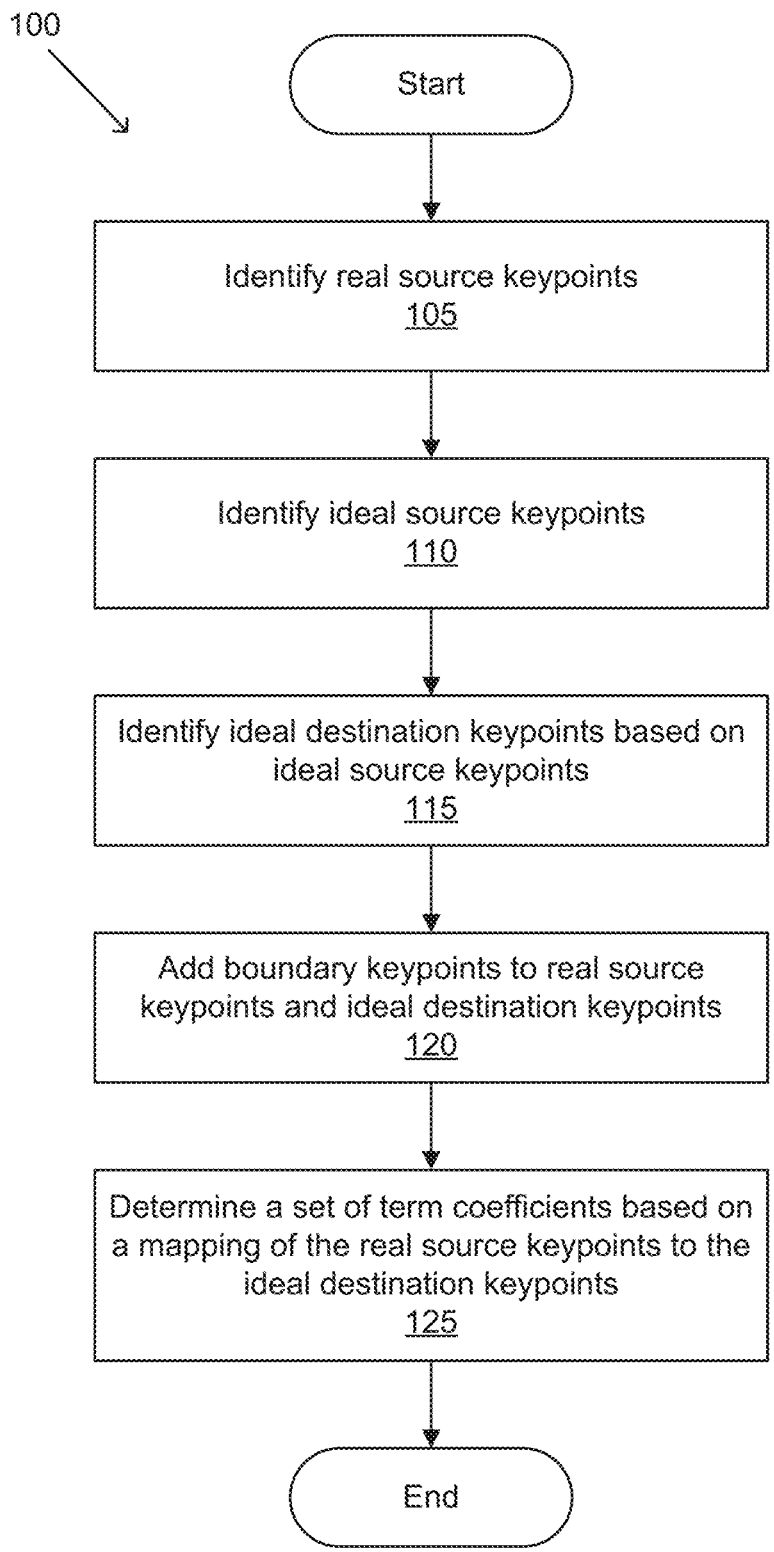
FIG. 1 conceptually illustrates an example of a process for determining term coefficients for a lens in accordance with an embodiment of the invention.

An example of a process for determining term coefficients for a lens in accordance with an embodiment of the invention is conceptually illustrated in FIG. 1. Process 100 identifies (105) real source keypoints in a source calibration image. Source calibration images (or source images) in accordance with some embodiments of the invention can include images of a calibration pattern.

In some embodiments, the process for identifying real source keypoints in a source calibration image can include a process for capturing a source calibration image that meets certain criteria based identified source keypoints in the image. Processes for capturing source calibration images are described in greater detail below.

Identifying real source keypoints in accordance with several embodiments of the invention can include adjusting the captured keypoints to adjust for small imperfections in the image capture. Such imperfections can lead to cascading errors through the process, so processes in accordance with numerous embodiments of the invention can adjust the captured keypoints using various methods, such as (but not limited to) coordinate recentering, reflection averaging, etc. In several embodiments, adjusted source keypoints can be used to minimize errors and increase the accuracy of the generated term coefficients.

Process 100 identifies (110) ideal source keypoints for the source image. Ideal source keypoints in accordance with various embodiments of the invention indicate the "ideal" coordinates for the real source keypoints form the source calibration image. In several embodiments, images can be scaled to a 180° field of view (FOV) so that ideal source keypoints can be computed based on geodesics that are computed to fit real source keypoints.

Process 100 identifies (115) ideal destination keypoints based on the ideal source keypoints. In various embodiments, reverse PolyMap operations can map ideal source keypoints in a warped (e.g., fisheye) space to destination keypoints in equirectangular space. Mapping source locations to destination locations in accordance with many embodiments of the invention can be performed using various processes, such as (but not limited to) Reverse PolyMap operations. Reverse PolyMap operations in accordance with several embodiments of the invention can use affine interpolation to increase efficiency and reduce calculation times. Reverse PolyMap operations in accordance with a variety of embodiments of the invention are described in greater detail below.

Process 100 identifies (120) boundary points for the real and ideal images. Boundary points in accordance with a number of embodiments of the invention are points at the boundaries of the source and/or destination images. In various embodiments, these points indicate the edge of the 180° FOV in source images and corresponding points at the edges of destination images. In numerous embodiments, the source image can be scaled to a specific FOV (e.g., 180°) before the ideal source keypoints are identified. Processes in accordance with a number of embodiments of the invention can use source keypoints to determine a field of view (FOV) of the image and can adjust the source image (e.g., by padding or cropping) to a 180° FOV.

Boundary points for source images in accordance with various embodiments of the invention can be computed by selecting a number of points at the boundary of a destination image (e.g., 11 per side) and mapping them to identify corresponding points in the source image. In many embodiments, boundary points for destination images can be computed by selecting a number of points at the boundary of a source image (e.g., periodically around the circumference) and mapping them to identify corresponding points in the destination image. Operations for performing such mappings in accordance with numerous embodiments of the invention can include (but are not limited to) PolyMap lookups, Reverse PolyMap lookups, etc.

Process 100 determines (125) a set of term coefficients based on a mapping of the real source keypoints to the ideal destination keypoints. In a number of embodiments, processes can use the determined term coefficients to transform real source images to dewarped destination images. In several embodiments, determining a set of term coefficients can be performed using an iterative process, such as (but not limited to) bidimensional least squares regression.

Figure 2:
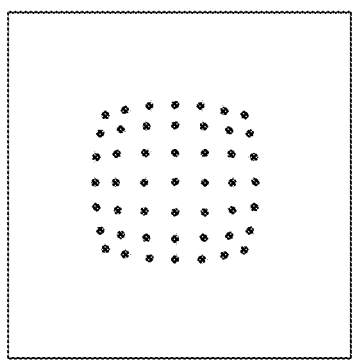
FIG. 2 illustrates an example of determining term coefficients for a source image.
Figure 2:
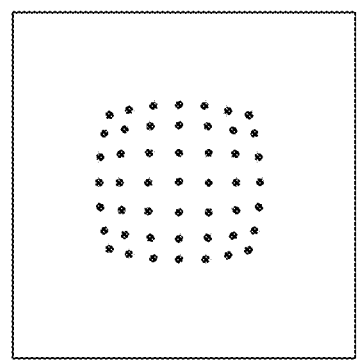
Figure 2:
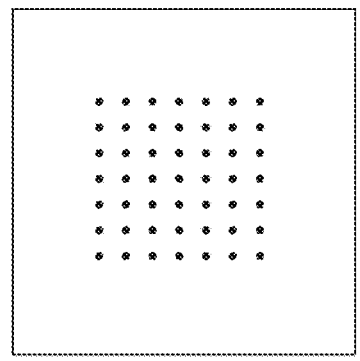
Figure 2:
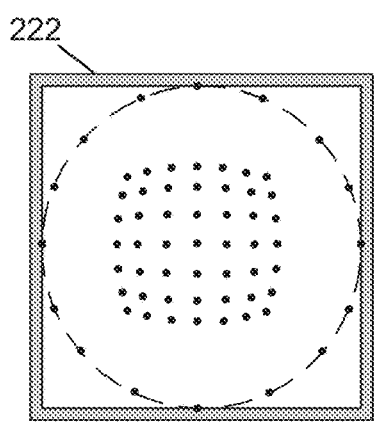
Figure 2:
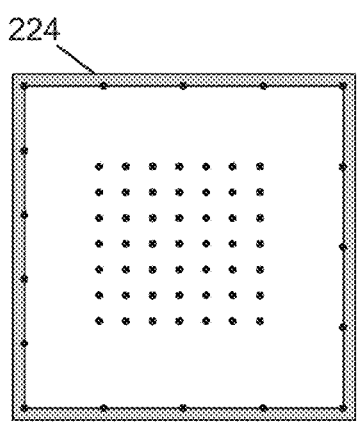

An example of determining term coefficients for a source image is illustrated in four stages 205-220 of FIG. 2. The first stage 205 illustrates a source image with keypoints identified from a calibration pattern captured in the image. Source images in accordance with a variety of embodiments of the invention can be captured and/or evaluated based on the position of keypoints within the frame as described in greater detail throughout this description. In a variety of embodiments, keypoints can be chessboard corners from a chessboard pattern used to calibrate the dewarping of images captured using a particular lens. Real source keypoints in accordance with numerous embodiments of the invention can be adjusted (e.g., using reflective averaging) to normalize the captured keypoints.

The second stage 210 illustrates ideal source keypoints for the source image computed from the real source keypoints. Ideal source keypoints in accordance with several embodiments of the invention indicate the ideal location of keypoints based on keypoints from a real source image.

The third stage 215 illustrates ideal destination keypoints in a destination image. Ideal destination keypoints in accordance with certain embodiments of the invention can indicate the corresponding location of ideal keypoints from the source image in a destination (or dewarped) image. Processes in accordance with some embodiments of the invention can use any of a variety of methods for identifying destination keypoints based on source keypoints, including (but not limited to) a reverse PolyMap operation.

The fourth stage 220 illustrates boundary keypoints for a source image 222 and a destination image 224. Boundary points in accordance with a number of embodiments of the invention are points at the boundaries of the source and/or destination images. In this example, the boundary of the source image 222 is identified at a 180° FOV (indicated by a dashed line), scaled down from the full image captured in the previous stages. Boundary points for the source image on the dashed line correspond to boundary points around a corresponding boundary in destination image 224. Processes in accordance with numerous embodiments of the invention can identify boundary points for a destination image (e.g., evenly spaced around the border) and compute corresponding locations for boundary points for the source image (e.g., using PolyMap operations). In many embodiments, boundary points can initially be identified in the source image (e.g., spaced around the boundary (or circumference)) and mapped to corresponding points on the border of the destination image (e.g., using Reverse PolyMap operations). Although many of the examples described herein PolyMap and reverse PolyMap operations, one skilled in the art will recognize that other methods for mapping locations between warped and dewarped images can be implemented without departing from this invention.

While specific processes for determining term coefficients for a lens are described above, any of a variety of processes can be utilized to determine term coefficients as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to determining term coefficients, the techniques disclosed herein may be used in any of a variety of dewarping operations, including (but not limited to) pushbroom satellite imaging and street view capture.

Detect/Capture Calibration Pattern Keypoints

Existing methods for detecting chessboard corners utilize two distinct processes. The first process performs an initial check over the entire image to determine if indicators exist that would confirm the presence of a chessboard in the frame. To do this, a set of convolution kernels, which are sensitive to checkerboard corners, are passed over every pixel of the image looking for the proper arrangement and specified number of corners. This is a very computationally intensive process and tends to run slowly when the image is at a very high resolution.

Once a checkerboard is found in the image and the corners are broadly localized, the second process performs a sub-pixel localization in the neighborhoods of those corners. Only the Regions of Interest (ROIs) in a narrow localization field around the coordinates found in the first process can be searched. These coordinates are very precisely designated in much less time than it took to perform the initial search because, in this secondary process, much less of the image is being examined. Because the initial step of determining whether a pattern is detected can take so long, the standard workaround to the high computational workload in the first process is to reduce the resolution of the image (downsampling) and only run the findChessboardCorners function on the full-resolution image when a chessboard is known to exist in the frame.

Rather than down-sampling, keypoint identification processes in accordance with some embodiments of the invention can employ novel methods for detecting a calibration pattern in a real source image and identifying keypoints of the calibration, such as (but not limited to) a chessboard. For many calibration processes, it can be beneficial to ensure that the calibration pattern is generally localized to the center of the frame and close enough to the camera to provide useful data (e.g., keypoints).

Figure 3:
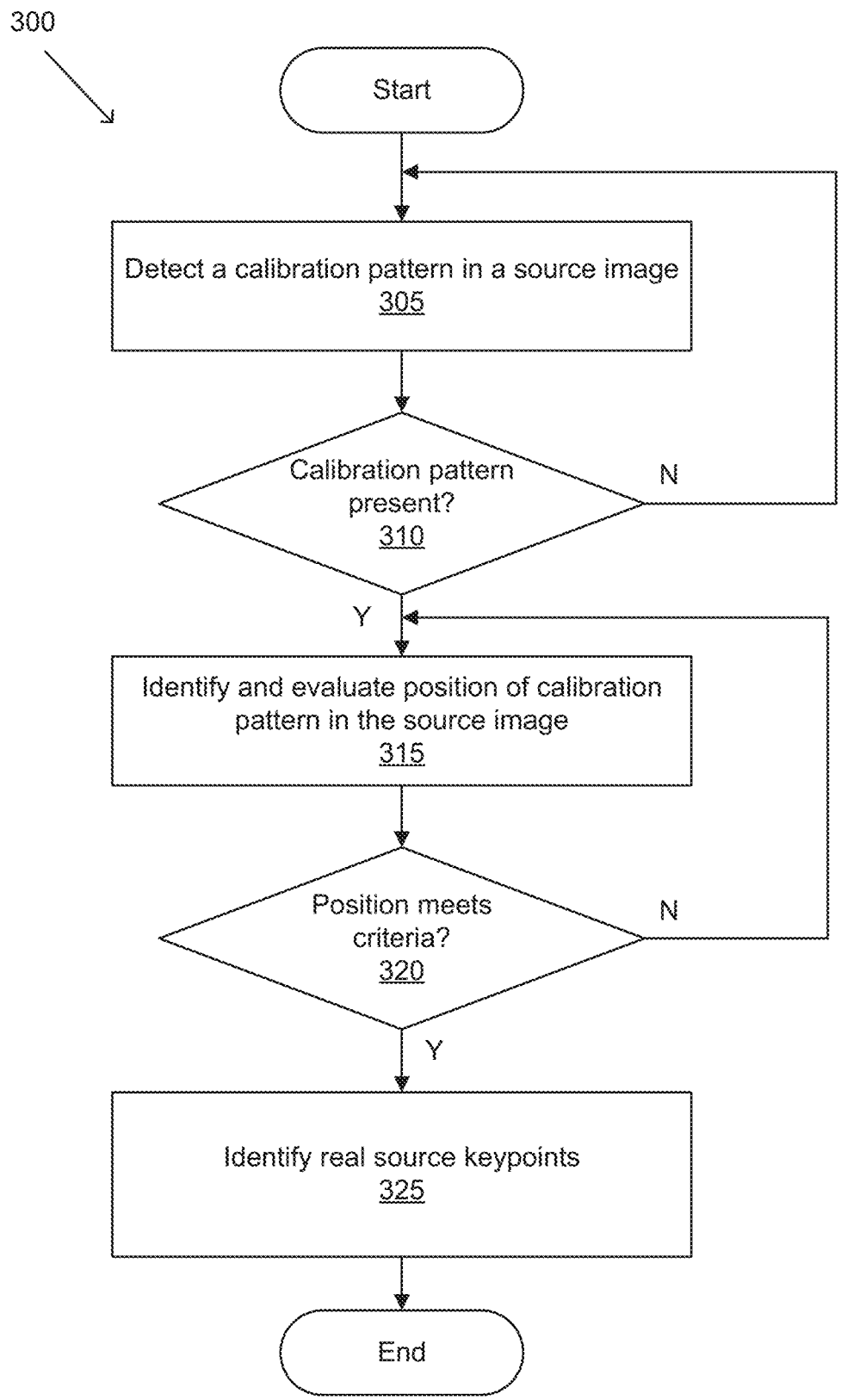
FIG. 3 conceptually illustrates an example of a process for capturing keypoints for real source images in accordance with an embodiment of the invention.

An example of a process for capturing keypoints for real source images in accordance with an embodiment of the invention is conceptually illustrated in FIG. 3. Process 300 detects (305) a calibration pattern in a source image (or video). In a number of embodiments, this can be accomplished by selecting a number (e.g., four) of regions of interest (ROIs) some distance from the center of the image that parts of a properly positioned calibration pattern should fill simultaneously. Since calibration patterns in accordance with many embodiments of the invention may contain only black or white colors, the presence of calibration patterns in the frame can be detected by performing an analysis of histograms of each of the ROIs. In several embodiments, processes can convert input frames to grayscale since black will be at one end of the spectrum and white will be at the other end of the spectrum. Processes in accordance with a variety of embodiments of the invention can compute histogram responses of each of the ROIs and determine that a calibration pattern is present based on the computed histograms. When a calibration pattern is present in an ROI, a strongly separated dense bimodal distribution with minimal noise would be expected. This means that the histogram for any particular ROI should (1) have a large chromatic difference between peak regions of the histogram, (2) have a narrow band of response in the vicinity of the highest peaks, (3) have only two places with a strong response in that region of the histogram, and (4) have very little response in all other areas.

When the process determines (310) that a calibration pattern is not detected, process 300 returns to step 305 to detect a calibration pattern in the source image. When the process determines (310) that a calibration pattern is detected, process 300 identifies (315) and evaluates the position of the calibration pattern in the source image. In some embodiments, the position of the calibration pattern can be evaluated for various characteristics, such as (but not limited to) distance from the camera, position within the frame (e.g., whether it is centered), skew, tilt, etc.

Identifying and evaluating the position of the calibration in accordance with certain embodiments of the invention can include various processes, such as (but not limited to) detecting keypoints, determining alignments between certain keypoints, and/or identifying a placement of a calibration pattern (e.g., relative to a center of the image). Identifying keypoints, once a pattern has been detected, can be performed in various ways, such as (but not limited to) the findChessboardCorners process. In certain embodiments, the identification and evaluation of the position of the calibration pattern can be performed as part of a live process, where frames are captured and evaluated until the position of the calibration pattern within a frame (or source image) meets a set of criteria. Processes in accordance with certain embodiments of the invention can identify and evaluate keypoints in a set of images by tracking the movement of the keypoints between successive frames of the image.

Process 300 determines (320) whether the position (e.g., placement, distance, skew, tilt, etc.) of the calibration pattern meets a set of criteria (e.g., centered within a threshold amount, not rotated beyond a threshold amount, not tilted beyond a threshold amount, etc.). In a number of embodiments, calibration patterns can be determined to meet a set of criteria based on the relationships between coordinates of keypoints of calibration patterns within the source image, alignment of keypoints, boundaries of a calibration pattern within the image, etc.

When the process determines (320) that the position of the calibration pattern does not meet a set of criteria for an acceptable input image, process 300 returns to step 315 to identify and evaluate the position of a calibration pattern in the source image. In a live capture scenario, keypoints of the calibration pattern may be tracked and evaluated in frames of a video stream until an acceptable (i.e., meeting the set of criteria) real source image is captured. In a variety of embodiments, criteria can include whether a calibration pattern is in the image at all, and may optionally revert to step 305 when a calibration pattern is not detected.

When the process determines (320) that the position of a calibration pattern does meet the set of criteria, process 300 identifies (325) real source keypoints for the calibration pattern within the real source image. Real source images in accordance with a number of embodiments of the invention can be used to calculate term coefficients as described herein.

In various embodiments, identifying real source keypoints for calibration patterns can include adjusting the coordinates of the identified real source keypoints to increase the usefulness of the coordinates. There can often be some amount of off-centeredness, rotation, and/or skew effects, especially during manual capture processes where a user holds a calibration pattern in front of a camera. These effects can often pass through to this stage as a result of using a threshold when evaluating the position of the calibration pattern within the image. To minimize those effects, processes in accordance with many embodiments of the invention can perform various processes to adjust the coordinates of keypoints in the real source image, such as (but not limited to) by employing a reflection averaging technique. Reflection averaging in accordance with a number of embodiments of the invention is described in greater detail below.

While specific processes for capturing keypoints for real source images are described above, any of a variety of processes can be utilized to capture keypoints as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Figure 4:
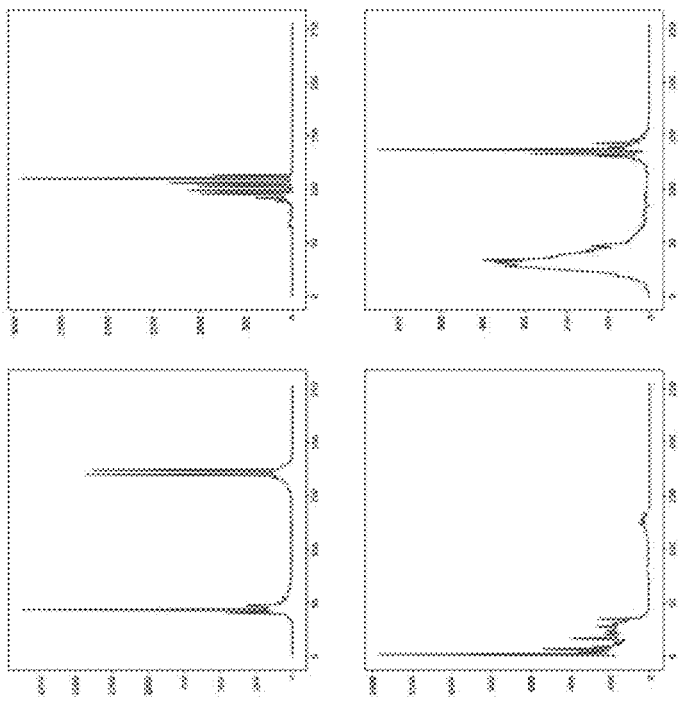
FIG. 4 illustrates an example of graphical user interface (GUI) for capturing a test image for calibration in accordance with an embodiment of the invention.
Figure 4:
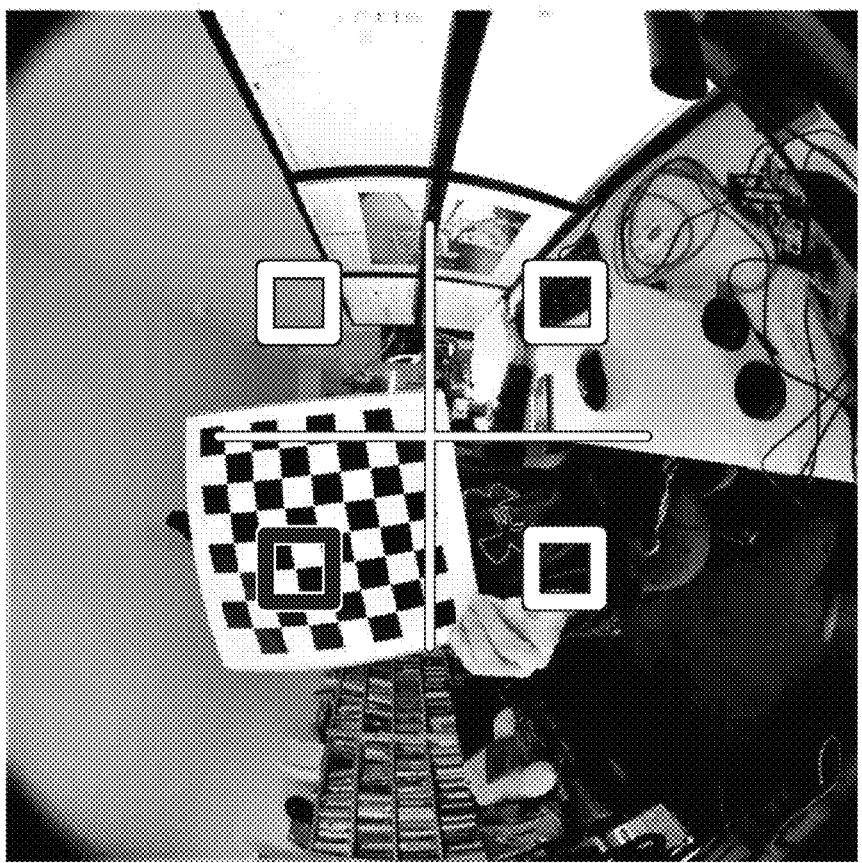
Figure 5:
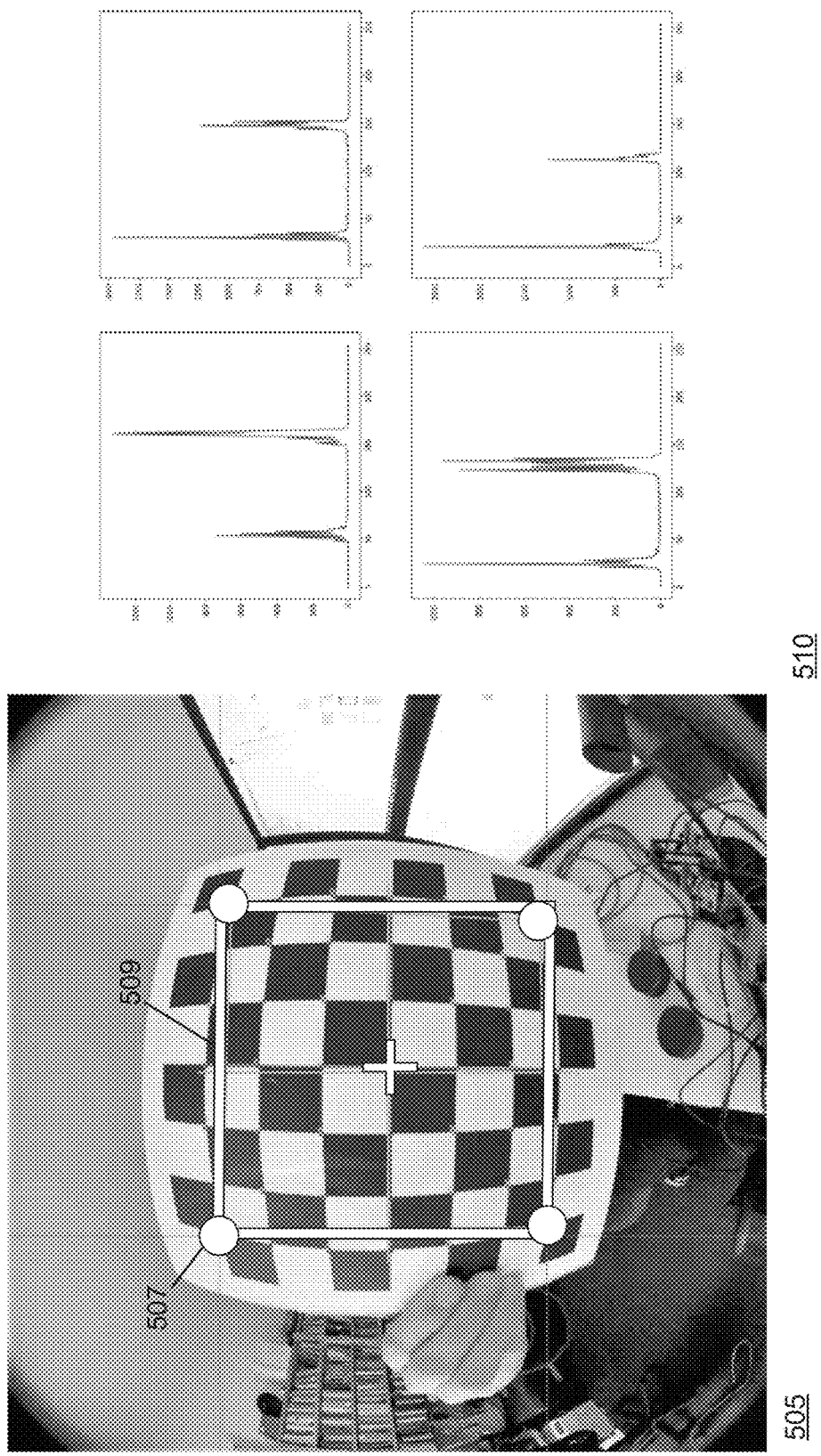
FIG. 5 illustrates examples of a GUI with alignment markers in accordance with an embodiment of the invention.
Figure 6:
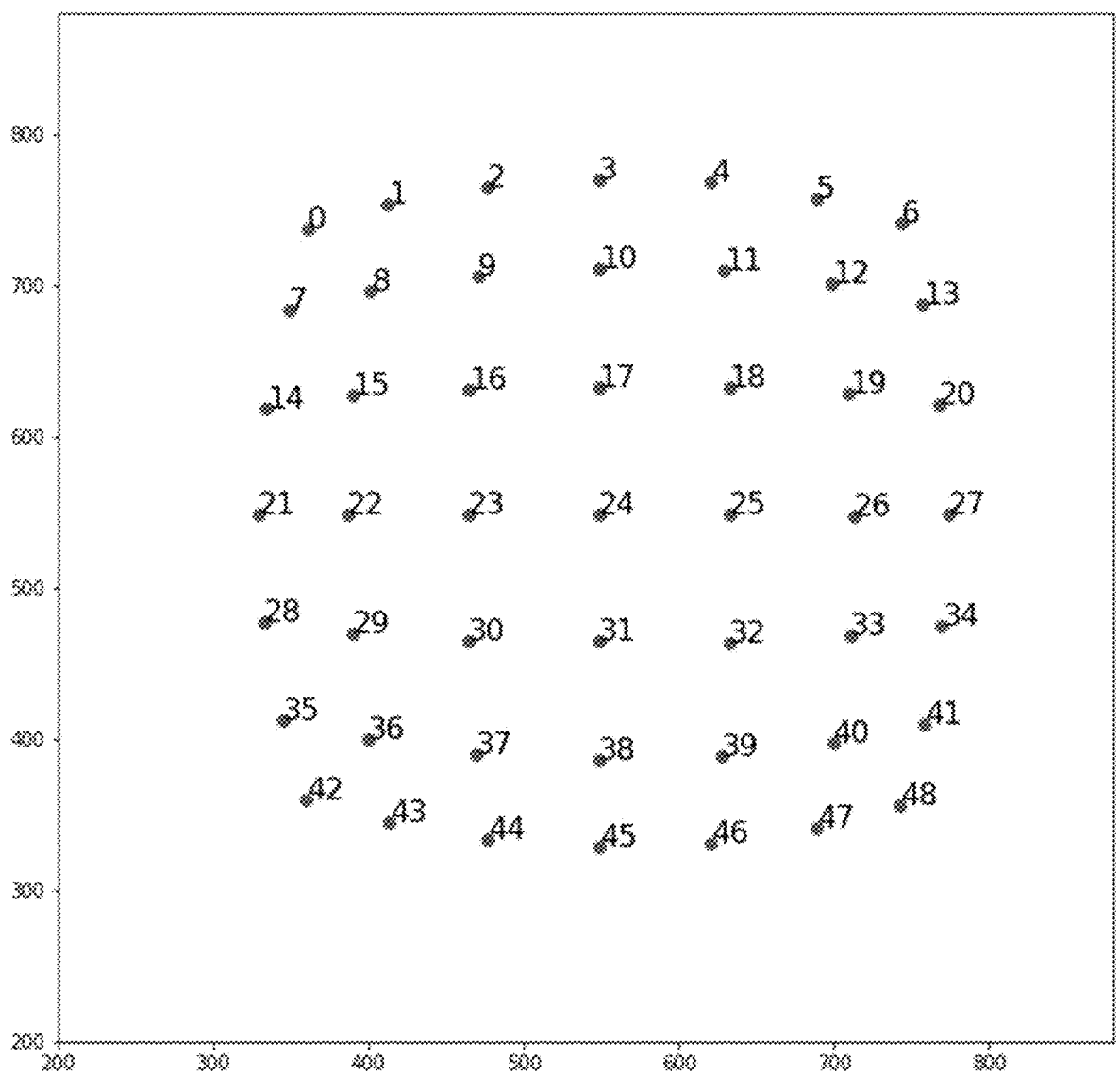
FIG. 6 illustrates an example of a plot of detected corners as points.

An example of capturing keypoints from a source image are illustrated in FIGS. 4-6. An example of graphical user interface (GUI) for capturing a test image for calibration in accordance with an embodiment of the invention is illustrated in FIG. 4. This example includes a capture 405 of a test image with regions of interest (ROIs) in the GUI and corresponding histogram charts 410. Test image 405 includes four ROI regions (indicated by black and white squares) in quadrants around the center of the image. Histogram charts 410 correspond to the image portions within the ROIs of test image 405.

In this example, the chessboard pattern is present only in the top left ROI. This fact is confirmed by the first histogram (top-left) of charts 410 showing two very narrow peaks at opposite ends of the grayscale spectrum and negligible contributions from everywhere else on the response curve. In this example, the bounding box for the top-left ROI has is indicated in a different color in response to this fact. The histogram at the top-right of charts 410 shows only a single peak which matches the fact that there is almost nothing but a white wall in that region. This fails the requirement that there be two distinct peaks. The bottom-left region of image 405 is mostly black but has some contribution from the edge of the wrist so the histogram at the bottom left of charts 410 is mostly accumulated on the low end of the spectrum (black) with a small peak towards the other (white) end. This does not meet the requirement that there be two strong peaks. The bottom-right ROI of image 405 includes the black keyboard and the white desktop. The bottom-right histogram of charts 410 does show a bimodal distribution but the peaks are too broad for the requirements (or criteria) to be met.

When the checkerboard is held in such a way that all four ROIs contain some part of the black and white pattern, the histogram response curve for all four regions will look like the one at the top-left of the image above. Computing the histogram for such targeted ROIs is not very computationally intensive and can be done in real-time, even on images with high resolution. In some embodiments, it can be a necessary and sufficient condition that all of the ROIs show the proper histogram response before it is assumed that the chessboard is centered and fills the frame.

Once all of the ROIs have given the desired response, processes in accordance with numerous embodiments of the invention can immediately detect corners (e.g., using the findChessboardCorners function) on the first pass and the subpixel localization part of the routine can be run. Although many of the examples described herein describe the findChessboardCorners function, one skilled in the art will recognize that similar processes for identifying keypoints in a test image can be utilized without departing from this invention. Processes in accordance with several embodiments of the invention can precisely track the locations of each of the corners it detects and can pass this information back to itself as it searches for corners in the next frame. That is, it can narrow its searches for corners to the neighborhoods around where those corners were found in the previous frame. In various embodiments, detected corners can be used to display alignment markers indicating various characteristics of the captured calibration pattern, such as (but not limited to) center, rotation, and skew of the calibration pattern relative to the forward-facing plane of the camera.

Examples of a GUI with alignment markers in accordance with an embodiment of the invention are illustrated in FIG. 5. In this example, the chessboard pattern is properly positioned in the center of the image so that the histograms 510 show the appropriate narrow bimodal distribution. Alignment markers in accordance with a number of embodiments of the invention can provide visual feedback to the person holding the chessboard so they can adjust the position, angle, and tilt to meet various input requirements. In this example, at the center of the image is a white cross that indicates where the center corner of the chessboard needs to be found. In addition to centering the pattern at the cross, processes in accordance with some embodiments of the invention can check the alignment of corresponding keypoints to determine a level of rotation and/or tilt. In this example, the distal interior corners 507 (indicated by white circles) indicate the outermost corners interior to the calibration pattern.

Vertical and horizontal alignment lines 509 (indicated by white lines) can be used to visually indicate rotation and tilt. Alignment lines 509 are drawn vertically and horizontally to indicate the expected locations and alignments of the most distal interior corners 507. When corresponding corners (e.g., corners mirrored across the center of the image along the vertical and/or horizontal axis) are properly aligned, this can indicate that the pattern is properly positioned. In some embodiments, when each pair of corresponding corners falls on a line (or within a specified threshold), a flag can be set indicating an alignment requirement has been met. For example, if the top-left corner and the bottom-left corner are vertically collinear, one of the requirements is met and a flag is set. The same checks can be performed for the top-right and bottom-right points. Horizontal collinearity can be checked between the top-left and top-right points, as well as between the bottom-left and bottom-right pairs. In this example, the bottom-right corner is misaligned with the bottom-right corner of the alignment lines, indicating that the position of the calibration pattern may yet need to be adjusted. Once the conditions are satisfied, and with the center properly positioned (e.g., at the white cross), the calibration pattern can be determined to be properly positioned within the image. Although many of the examples described herein utilize the outermost interior corners, one skilled in the art will recognize that other sets of corresponding keypoints can be used as appropriate to a given application without departing from this invention.

When all requirements have been met, it can be determined that the chessboard is centered, not rotated, and not skewed (tilted towards the camera). At this point, processes in accordance with many embodiments of the invention can capture and store the identified keypoints for processing. In many embodiments, the x and y coordinates can be separately stored in two arrays. In this example, for an 8×8 chessboard pattern, with 7×7 detected internal corners, the arrays can be of length 49 ($X=x[x_0, x_1, \ldots, x_{48}]$ and $Y=[y_0, y_1, \ldots, y_{48}]$).

This can be visualized by plotting the ordered pairs (x[n], y[n]) for n=0, 1, ..., 48. An example of a plot of detected corners as points is illustrated in FIG. 6. The coordinates in this figure correspond to the places in the test image where the chessboard corners of FIG. 5 were detected. Because of the subpixel localization part of the findChessboardCorners function, the precision of these coordinates can be very precise. The higher the resolution of the input image, the higher the accuracy of these measurements can be. In several embodiments, various adjustments can be made to increase the usefulness of the coordinates of the real source keypoints.

There is often some amount of off-centeredness, rotation, and/or skew effects, especially during manual capture processes where a user holds a calibration pattern in front of a camera. These effects can often pass through to this stage as a result of using a threshold when certifying alignment. To minimize those effects, processes in accordance with many embodiments of the invention can perform a reflection averaging technique. In some embodiments, processes can flip coordinates for keypoints across the vertical and/or horizontal axes and use an aggregate (e.g., an average) of the locations for each keypoint. This can also serve to ensure that the coordinates have the same distribution and spacing in each quadrant.

In certain embodiments, the center can be shifted to the origin by taking the point (x[24],y[24]) as the origin.

$$x[n]=x_n-x_{24}$$

$$y[n]=y_n-y_{24}$$

With the coordinates of the points now centered, the next step is to find the averages. While this is not mathematically rigorous, it does an adequate job of localizing the corners to where they are supposed to have been detected. That is, the discrepancy from the true location of one point is offset by the discrepancies in the other directions for the corresponding points after various reflections. In the example of FIG. 6, the average position of points 0, 6, 42, and 48 can be averaged to identify an averaged position for the points reflected around the center. Once points are re-centered on the origin, processes in accordance with various embodiments of the invention can reflect the points horizontally, vertically, and both horizontally and vertically. The coordinates of each of these points are then averaged and a new coordinate is stored for each of them. When the arrays of coordinates are recast them as square arrays, averaging can be written in matrix notation using the anti-diagonal identity matrix $\hat{D}$. Define the following matrices:

$$\hat{X} = \begin{bmatrix} x_0 & x_1 & \cdots & x_6 \\ x_7 & x_8 & \cdots & x_{13} \\ \vdots & \vdots & \ddots & \vdots \\ x_{42} & x_{43} & \cdots & x_{48} \end{bmatrix}$$

$$\hat{Y} = \begin{bmatrix} y_0 & y_1 & \cdots & y_6 \\ y_7 & y_8 & \cdots & y_{13} \\ \vdots & \vdots & \ddots & \vdots \\ y_{42} & y_{43} & \cdots & y_{48} \end{bmatrix}$$

$$\hat{D} = \begin{bmatrix} 0 & \cdots & 0 & 1 \\ 0 & \cdots & 1 & 0 \\ \vdots & & \vdots & \vdots \\ 1 & \cdots & 0 & 0 \end{bmatrix}$$

Two useful facts about the anti-diagonal identity matrix $\hat{D}$ are that $\hat{D}\hat{A}$ performs a vertical flip on matrix $\hat{A}$ and $\hat{A}\hat{D}$ performs a horizontal flip on $\hat{A}$. Using $\hat{D}$ to perform "flip" transformations on $\hat{X}$ and $\hat{Y}$, $\hat{X}_{avg}$ and $\hat{Y}_{avg}$ can be computed as follows:

$$\hat{X}_{avg}=[\hat{X}+\hat{D}\hat{X}-\hat{X}\hat{D}-\hat{D}\hat{X}\hat{D}]/4$$

$$\hat{Y}_{avg}=[\hat{Y}-\hat{D}\hat{Y}-\hat{Y}\hat{D}+\hat{D}\hat{Y}\hat{D}]/4$$

The matrices can be flattened again into arrays.

$$\hat{X}_{avg}=[\bar{x}_0,\bar{x}_1, \ldots, \bar{x}_{48}]$$

$$\hat{Y}_{avg}=[\bar{y}_0,\bar{y}_1, \ldots, \bar{y}_{48}]$$

The procedure described in this section provides an example of a way to detect the presence of a chessboard without downsampling, find the coordinates of the corners of a chessboard, and adjust for the effects of centering, rotation, and tilt. One skilled in the art will recognize that similar systems and methods can be used in various applications without departing from this invention.

Generate Ideal Source Keypoints

Figure 7:
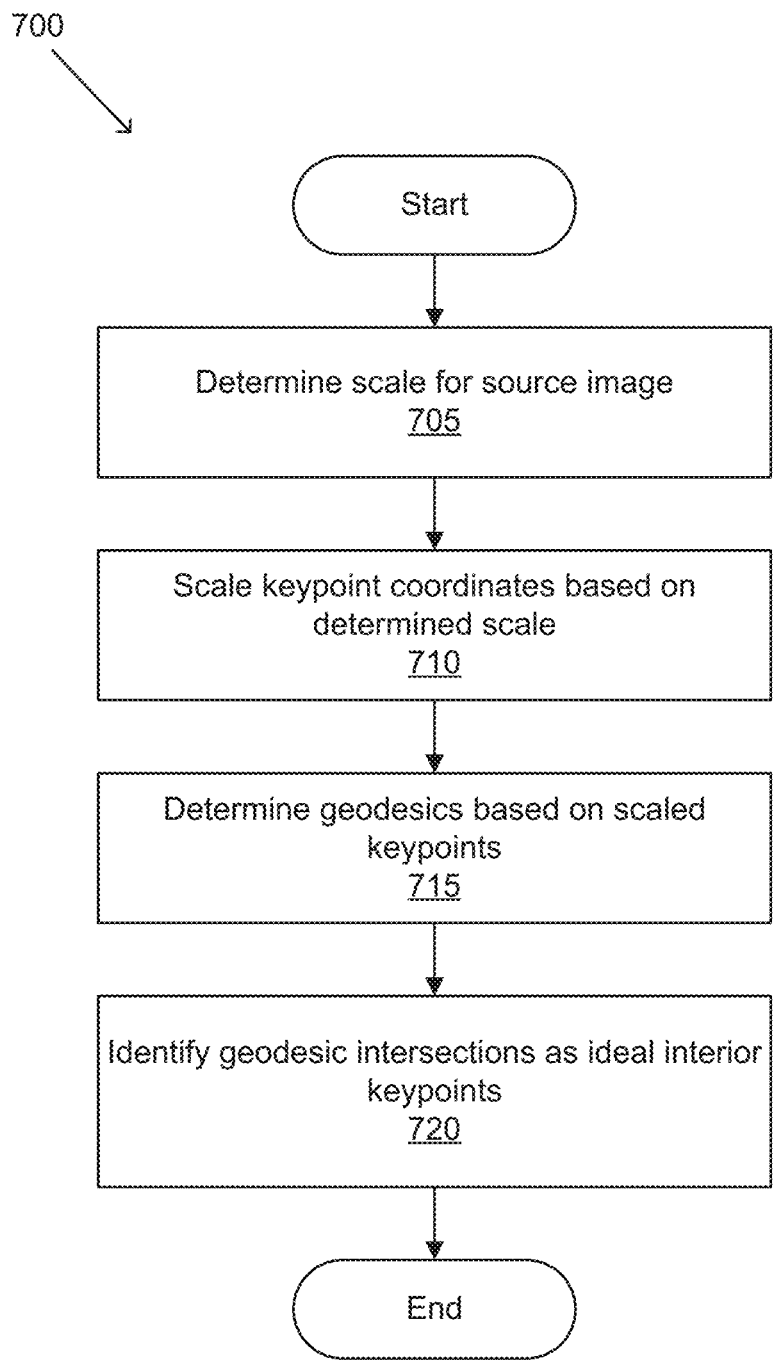
FIG. 7 conceptually illustrates an example of a process for generating ideal source keypoints in accordance with an embodiment of the invention.

An example of a process for generating ideal source keypoints in accordance with an embodiment of the invention is conceptually illustrated in FIG. 7. Process 700 determines (705) the scale for a source image. In some embodiments, the scale is determined based on an adjustment necessary to scale a calculated field of view (FOV) of a lens associated with a source image to a 180° FOV. Processes in accordance with certain embodiments of the invention can determine the FOV of an image in various ways, such as (but not limited to) using the lens specifications, calculating the FOV based on keypoint ratios, etc. In a number of embodiments, determining the scale can include identifying a projected angle to an anchor point. In certain embodiments, anchor keypoints can be the outermost interior keypoint of a calibration pattern. Projected angles in accordance with a number of embodiments of the invention can be identified based on a ratio between an anchor keypoint and another keypoint in the image. In some embodiments, the scale for a source image can include a distance to a 180° field of view (FOV). In a number of embodiments, the FOV can be computed based on an aggregate (e.g., average) of computed angles for multiple anchor keypoints in the source image.

Process 700 scales (710) keypoint coordinates based on the determined scale. In several embodiments, keypoint coordinates can be scaled based on the distance to a 180° FOV. In many embodiments, source images are scaled to 180° for various processes, including (but not limited to) computing geodesics, determining boundary points, etc. Scaling in accordance with a number of embodiments of the invention can include processes for cropping, padding, normalizing, etc. Determining scale and scaling keypoints is described in greater detail below.

Process 700 determines (715) geodesics based on the scaled keypoints. In certain embodiments, the scaled keypoints are axis keypoints identified along perpendicular axes (e.g., along the x- and y-axes). Interior keypoints (or keypoints not directly along the axes) can be predicted to fall on one of the geodesics that passes through the points at 180° along the axes and the axis keypoints.

Process 700 identifies (720) intersections of the geodesics as ideal keypoints. When geodesics are determined along two perpendicular axes, the intersections can indicate the locations for ideal interior keypoints between the axes. Ideal interior keypoints in accordance with various embodiments of the invention can be computed based on scaled keypoints from a source image. In some embodiments, ideal interior keypoints can be calculated for a single quadrant of an image and reflected across to compute ideal interior keypoints for the remaining three quadrants of the image. Processes and explanations for determining geodesics and their intersections are described in greater detail below.

While specific processes for generating ideal source keypoints are described above, any of a variety of processes can be utilized to generate ideal source keypoints as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. An example of generating ideal source keypoints and further details are described throughout this description.

Determining Scale

Systems and methods in accordance with some embodiments of the invention can determine the scale for an image in order to scale keypoints of an image to a fixed FOV (e.g., 180°). Scaling keypoints in accordance with some embodiments of the invention can simplify the calculation of geodesics for computing ideal source keypoints. In a variety of embodiments, the effective FOV of a lens can be determined by examining the ratios of keypoint coordinates in a source image. The ratios of these distances from the center can be used in accordance with certain embodiments of the invention to accurately indicate what the FOV of the entire image is from edge to edge (or top to bottom).

Processes in accordance with a number of embodiments of the invention can determine scale based on a calculated FOV of an image. In several embodiments, the calculated FOV of an image can be used for dewarping a source image (e.g., using PolyMap). If the FOV of the camera is incorrectly assigned, dewarping processes may produce an image that is not representative of the "real world" it is rendering. When a wide-angle camera is used, it is common to find that the FOV specified by the manufacturer and the "effective FOV" are not the same. This can happen when the radial distortion factor is roughly linear from the center outward but, as the image data is captured closer to the edge of the fisheye orb, a pinching effect is seen. Another way to say this is that the angular sweep per pixel may decrease towards the outer ring of the image.

Figure 8:
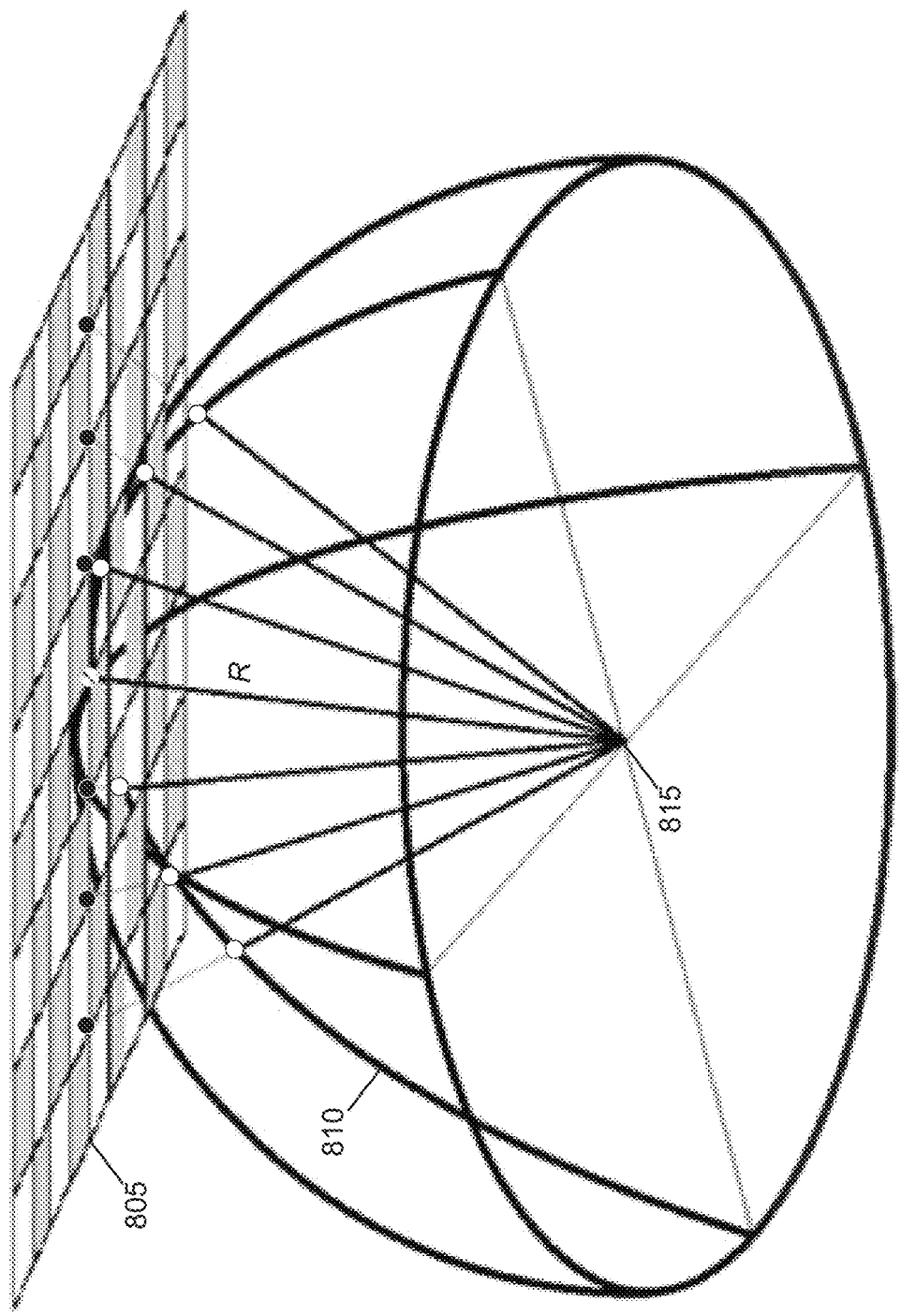
FIG. 8 illustrates a visualization of locations of keypoints using a spherical projection.

When a calibration pattern (e.g., a chessboard pattern) is properly (or very nearly) aligned to the front-facing plane of the camera lens, the apparent locations of the corners can be visualized with a spherical projection. A visualization of locations of keypoints using a spherical projection is illustrated in FIG. 8. This example illustrates the physical locations of the seven keypoints (as black circles) lying on one of the principal axes 805 of a chessboard that is perfectly centered over the camera lens. The chessboard center 815 is at some radius R from the camera lens and directly in front of it. This depiction also shows the apparent corresponding locations (as white circles) of the chessboard corners on a hemispherical projection 810 around the camera lens. The chessboard corners are observed on the surface of the sphere (illustrated as white circles). They are located at the intersection of each ray emanating from the center of the sphere, terminating on the corners. Although many of the examples are described with keypoints along the principal axes, one skilled in the art will recognize that points along the diagonals can be used without departing from the invention.

Figure 9:
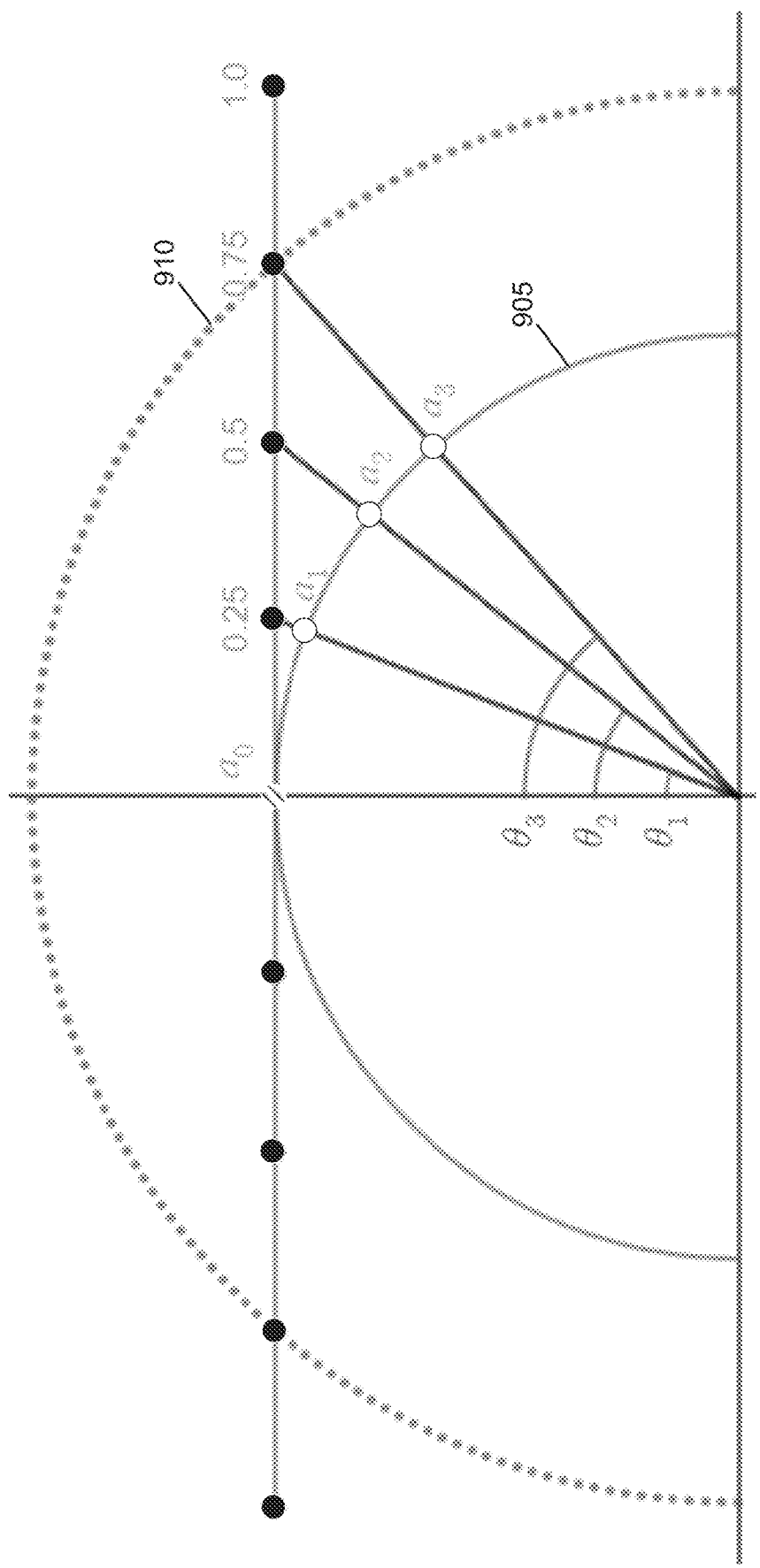
FIG. 9 illustrates an example of a slice visualization of the location of keypoints using a spherical projection that is restricted to a plane that splits the hemisphere along that principal axis.

An example of a slice visualization of the location of keypoints using a spherical projection that is restricted to a plane that splits the hemisphere along that principal axis is illustrated in FIG. 9. This figure includes a portion of an inner circle 905 and an outer circle 910. Inner circle 905 is drawn through the point $a_3$ and its circumference is defined to be 4 units, so that the arc from $a_0$ to the intersection with the x-axis has a length of 1. Outer circle is defined with a radius of 1 unit, so that the distance from the center to the intersection on the x-axis (or from the top of the outer arc to its intersect with the x-axis) is 1 unit. This is done so that the scaled value of point $a_3$ is simply the pixel value of the distance to the $a_3$ keypoint divided by the pixel value of the point that would be 90° clockwise from the y-axis.

The apparent locations of the chessboard corners are points (indicated by white circles labeled as $a_0$, $a_1$, $a_2$, and $a_3$) on the inner arc 905 (the surface of the sphere) where the rays from the origin to the corners of the chessboard intersect it. For example, the length of the arc from $a_0$ to $a_3$ would represent the pixel distance from the center of an image to the keypoint $a_3$.

Processes in accordance with certain embodiments of the invention can compute the pixel value of the point that would be 90° from the center axis (e.g., from the center of the image to the ring at 180° FOV). It is noteworthy that the angle from the image center to any single corner is variable but the ratio of two of them gives us some very useful information. Processes in accordance with various embodiments of the invention can use the ratio of two keypoints (e.g., $a_2/a_3$) to compute the FOV. Although examples are described with reference to $a_2$ and $a_3$, one skilled in the art will recognize that different keypoints and their ratios can be used without departing from the invention. In certain embodiments, processes can determine a function to compute the angle to an anchor point (e.g., $a_3$) based on ratios between keypoints.

In numerous embodiments, determining a function to compute the angle to an anchor point can be performed by fitting (e.g., using a least squares regression) a function to a table of angles ($\theta$) and their corresponding ratios ($a_2/a_3$). An example of such a table is illustrated below.

| $\theta$ | $a_3$ | $a_2$ | $a_2/a_3$ |
|---|---|---|---|
| 75.000 | 0.833 | 0.757 | 0.908 |
| 64.286 | 0.714 | 0.602 | 0.842 |
| 56.250 | 0.625 | 0.499 | 0.799 |
| 50.000 | 0.556 | 0.427 | 0.769 |
| 45.000 | 0.500 | 0.374 | 0.749 |
| 40.909 | 0.455 | 0.333 | 0.734 |
| 37.500 | 0.417 | 0.301 | 0.722 |
| 34.615 | 0.385 | 0.275 | 0.714 |

| θ | $a_3$ | $a_2$ | $a_2/a_3$ |
|---|---|---|---|
| 32.143 | 0.357 | 0.253 | 0.707 |
| 30.000 | 0.333 | 0.234 | 0.702 |

In this table, a range of angles θ are shown in the first column. The second column indicates the expected distance to $a_3$ when the length of the arc to 90° is scaled to 1. For example, when θ=75, $a_3$=0.833 (or 75/90). In this example, with the anchor keypoint $a_3$, the scaled pixel values of other interior keypoints ($a_2$ and $a_1$) can be calculated:

$$a_n = \frac{2}{\pi}\arctan\left(\frac{n}{3}\tan\left(a_3\frac{\pi}{2}\right)\right)$$

or more generally:

$$a_n = \frac{2}{\pi}\arctan\left(\frac{n}{N}\tan\left(a_N\frac{\pi}{2}\right)\right)$$

where N is the number of the anchor keypoint from the center of a calibration pattern. The third column indicates the calculated values for $a_2$ for each of the $a_3$ values. The fourth column indicates the computed ratios $a_2/a_3$.

Figure 10:
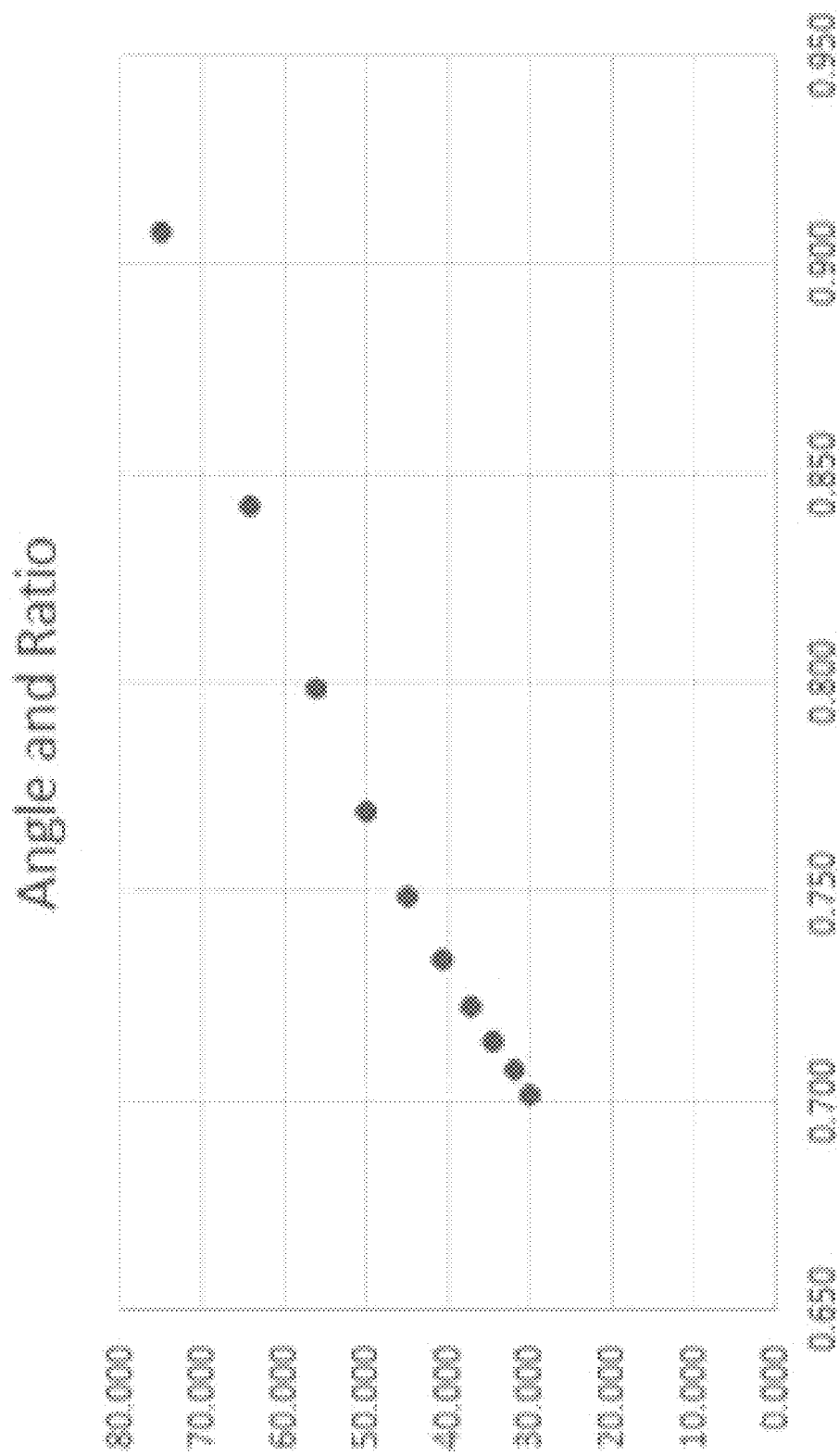
FIG. 10 illustrates an example of the plot of keypoint ratios to angles.

An example of the plot of keypoint ratios to angles is illustrated in FIG. 10. In this example, the ratios ($a_2/a_3$) are the independent variable and the angles to the anchor points ($a_3$) are the dependent variable. The ratios are plotted along the x-axis and the θ values along the y-axis. Processes in accordance with a number of embodiments of the invention can run a least-squares regression on the values to find an equation of the curve. In this example, the resulting equation is:

$$\theta = 81491.362R^5 - 339316.407R^4 + 565845.582R^3 - 472651.153R^2 + 198042.004R - 33312.428$$

The regression curve for this set of data allows us to specify the ratio $a_2/a_3$ and it delivers the θ that the point $a_3$ makes with the image center. In this way, only the ratios of the distances from the center point are needed to determine the angle at which the point $a_3$ lies away from the center of the image. Processes in accordance with some embodiments of the invention can use that angular value (assuming a linear profile for the radial distortion) to determine the effective FOV of the image. For this example, if $a_3$ is the distance to the right-most point along the x-axis (e.g., $x_{27}$ of FIG. 6) and an angle (θ) is computed from the regression equation, the FOV of the full image width (w) can be computed as:

$$FOV = \frac{\text{width}}{x_{27}} * \theta$$

Figure 11:
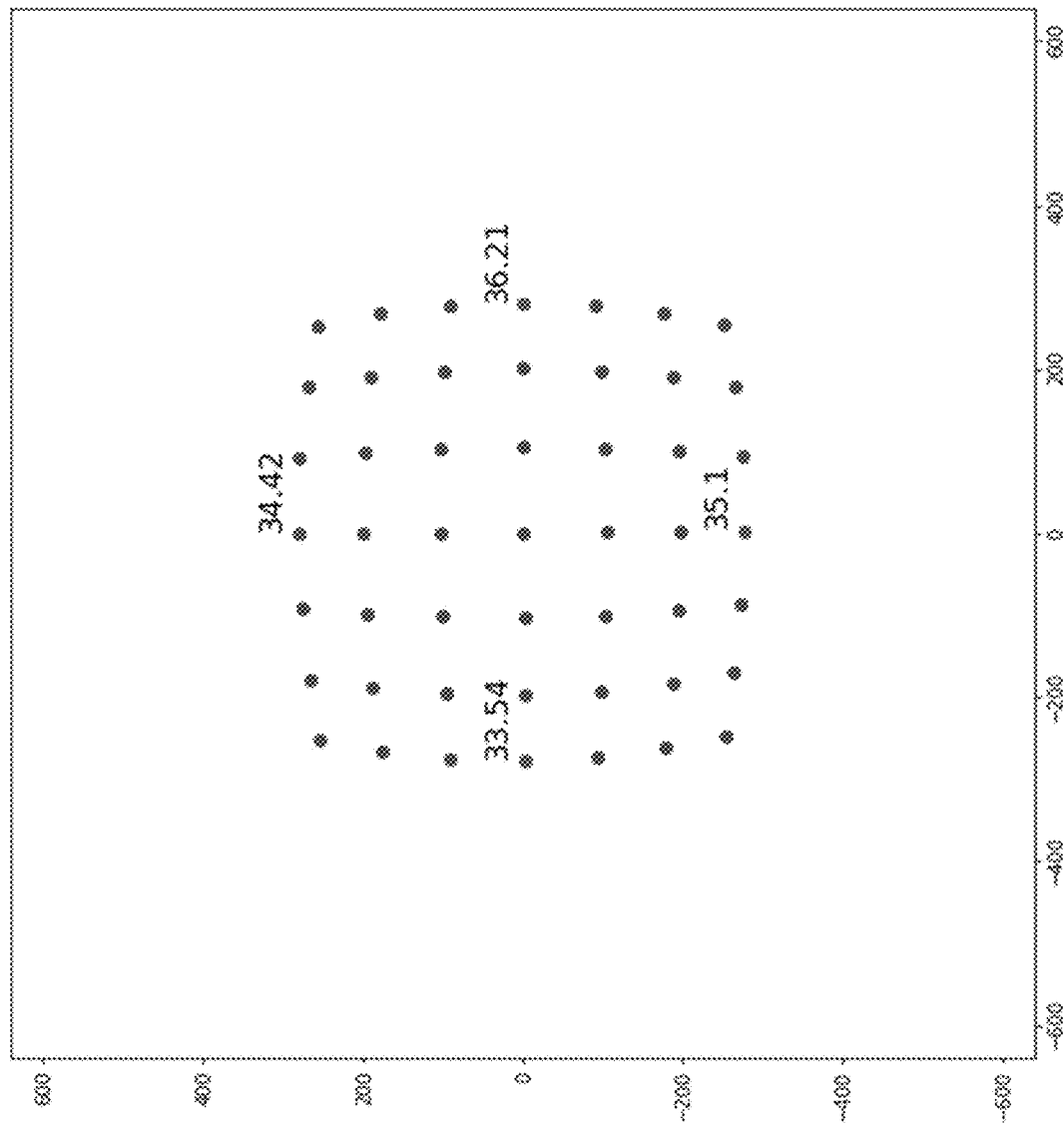
FIG. 11 illustrates an example of angle calculations in accordance with an embodiment of the invention.

An example of angle calculations in accordance with an embodiment of the invention is illustrated in FIG. 11. In this example, an angle is computed for anchor points along each of the principle axes. Due to variations and imperfections, the calculated angles may vary slightly. In several embodiments, an average of two or more of the angles can be used.

Scaling Keypoints

Figure 12:
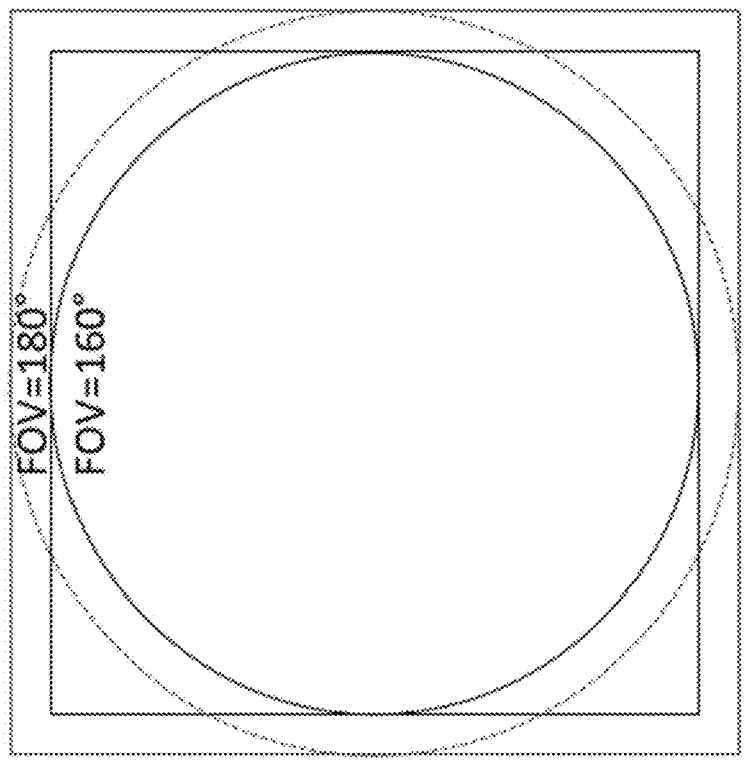
FIG. 12 illustrates examples of cropping and padding to a 180° FOV.
Figure 12:
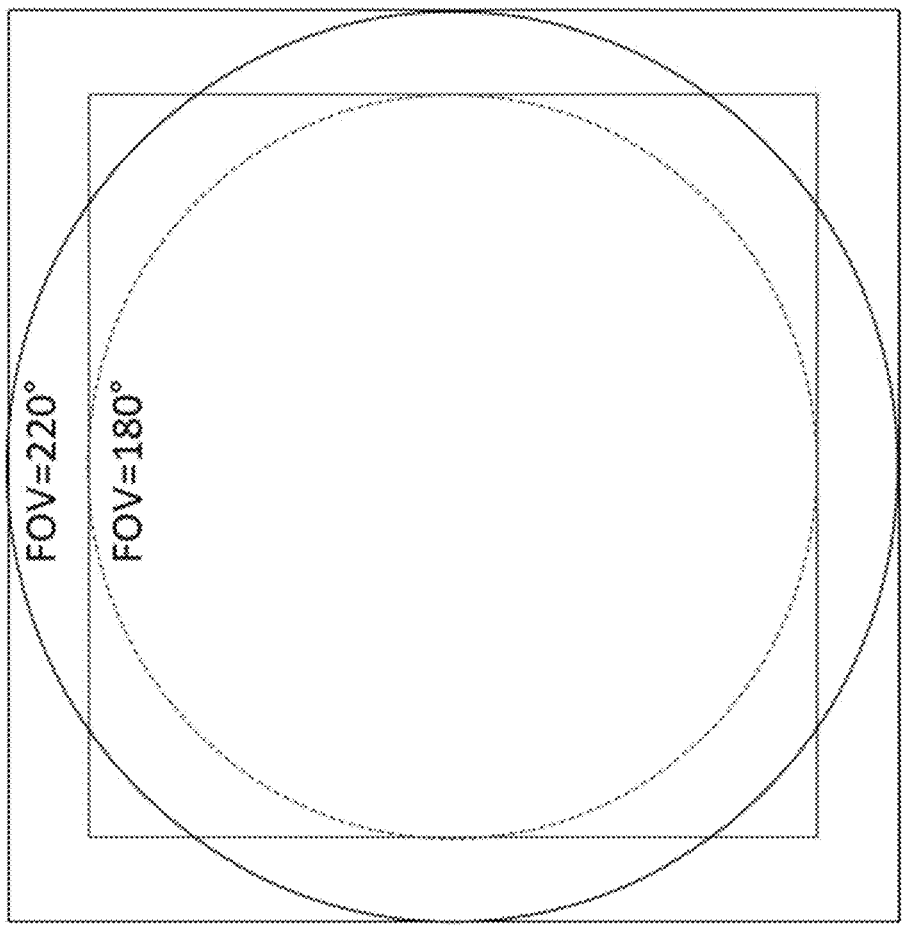

In numerous embodiments, keypoints can be scaled to take into account the computed FOV. If the FOV is larger than 180°, edges of the source images can be cropped. If the FOV is less than 180°, source images can be padded with blank space. If the FOV of the lens is exactly 180°, no scaling is necessary. Examples of cropping and padding are illustrated in FIG. 12.

In several embodiments, keypoints can be scaled based on a pixel value distance to a 180° edge, where $$a_3 = \frac{a_{23}}{\text{distance to edge}}.$$

Processes in accordance with a number of embodiments of the invention can use the following formula to redefine the ideal (or scaled) $a_3$ value based on the FOV of the lens.

$$a_3 = \frac{FOV}{180} * a_3$$

Figure 13:
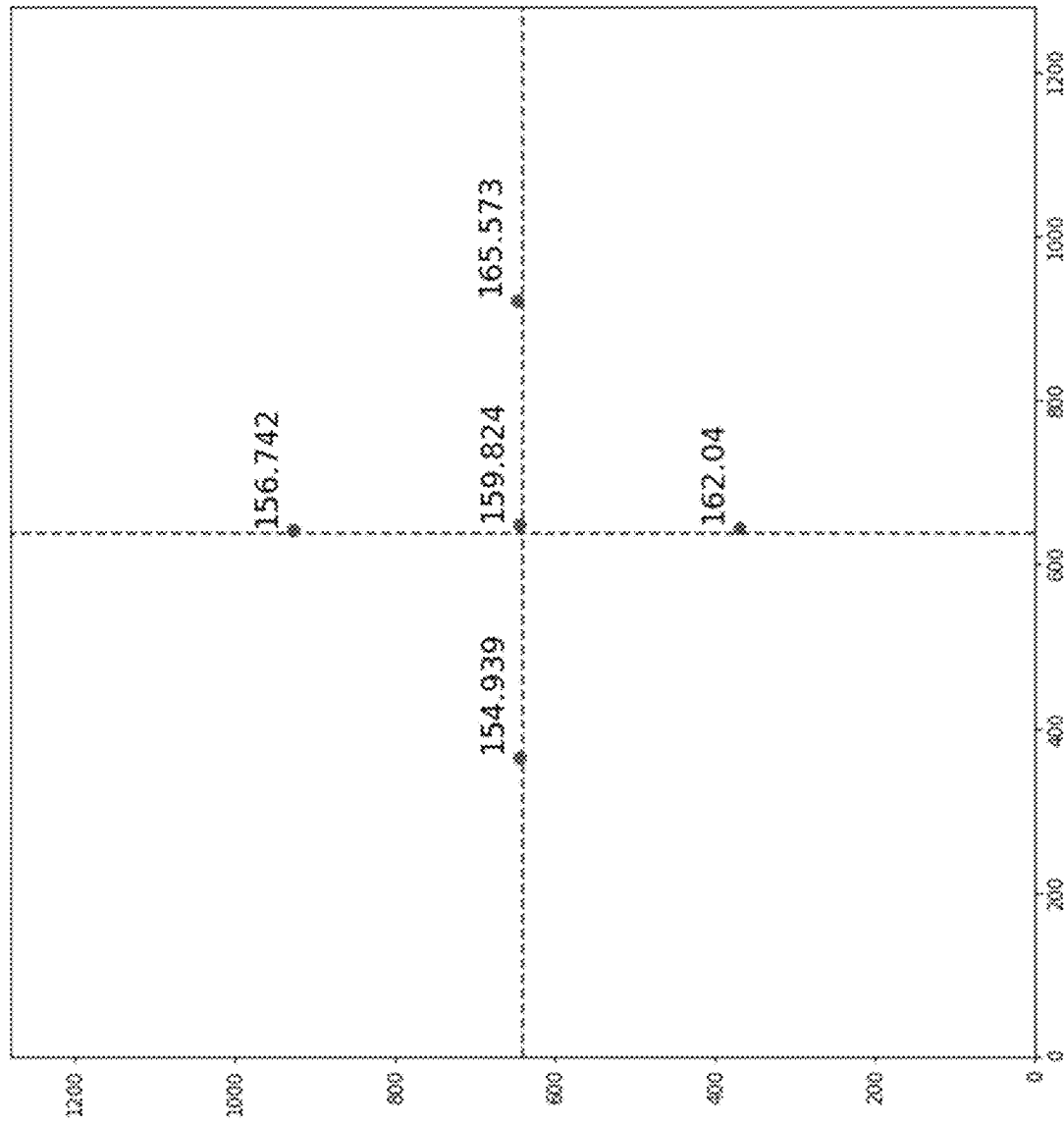
FIG. 13 illustrates an example of computed FOVs for an image.

An example of computed FOVs for an image are illustrated in FIG. 13. In this example, using the formula above, the computed FOV of the image is shown on each of those four $a_3$ coordinates and the average of the four values is shown at the origin. The data-sheet for the particular camera this data came from shows the FOV is 160°. The computed value was therefore accurate to within 0.176° of the value claimed by the manufacturer.

Determining Geodesics

A fundamental result of Differential Geometry is that the apparent locations of the chessboard corners will all fall on geodesics (Great Arcs) that pass through the poles of the unit circle (the ring at 180°). Using the distance to the ring, processes in accordance with some embodiments of the invention can compute geodesics for the idealized chessboard corners.

Figure 14:
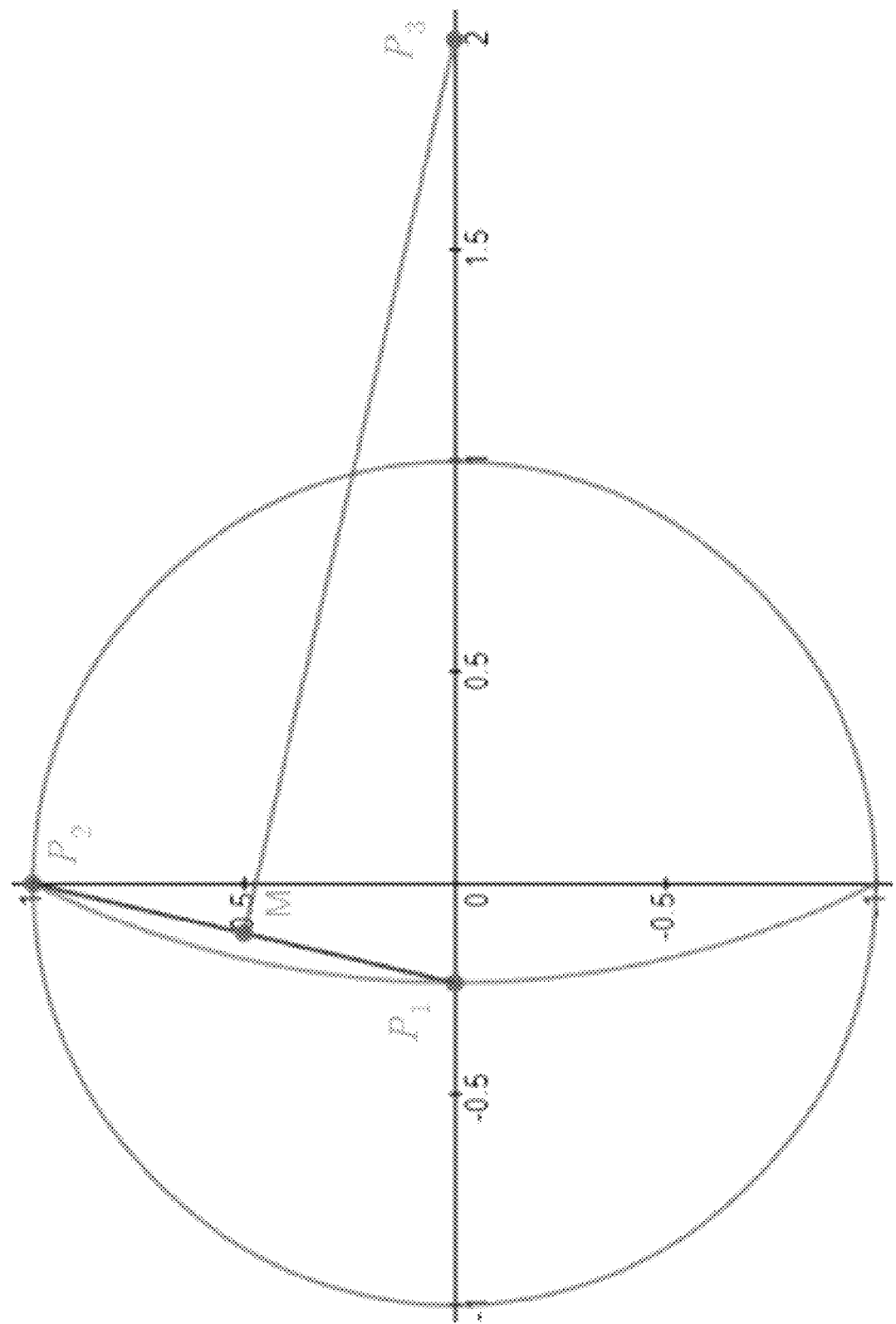
FIG. 14 illustrates an example of drawing geodesics in accordance with an embodiment of the invention.

An example of drawing geodesics in accordance with an embodiment of the invention is illustrated in FIG. 14. In this example, the $a_n$ points can be plotted on the principal axes and geodesics can be drawn passing through the poles and each of these points. By computing geodesics along two axes, the intersects of the geodesics are the theoretical ideal locations of the other corners. Each geodesic is a circle centered at some point on one of the principal axes. To draw these curves, processes in accordance with various embodiments of the invention can calculate two other sets of values: the x-intercepts and the radii of each geodesic. The $a_n$ values can be used as one of the x-intercepts. The distance from the origin to the point $P_1$ (or one of the $a_n$ points on the axis) can be computed based on the $a_n$ values.

The intersect of the line $\overline{MP_3}$ with the x-axis can be used to find the actual radius of that Great Arc. The line segment $\overline{MP_3}$ is the perpendicular bisector of the line segment $\overline{P_1P_2}$. Since the slope of $\overline{P_1P_2}$ is $1/a_n$, the slope of $\overline{MP_3}$ is $-a_n$. Using the point-slope formula for a linear equation, processes in accordance with a number of embodiments of the invention can solve for the x-intercept ($r'_n$). Since the radius of the Great Arc is the distance from $P_3$ to $P_1$, the radius can be computed as $r_n = a_n + r'_n$ $$r'_n = \frac{1 - a_n^2}{2a_n}$$

-continued $$r_n = \frac{1 + a_n^2}{2a_n}$$

Since the center and radius of the circle that passes through the poles of the circle as well as a specific value of $a_n$, processes in accordance with some embodiments of the invention can draw arcs for each value of $a_n$. Processes in accordance with a variety of embodiments of the invention can use a starting value for $a_3$, use that to compute $a_2$ and $a_1$, and then use those values to find $r'_3$, $r'_2$, and $r'_1$ as well as $r_3$, $r_2$, and $r_1$.

Figure 15:
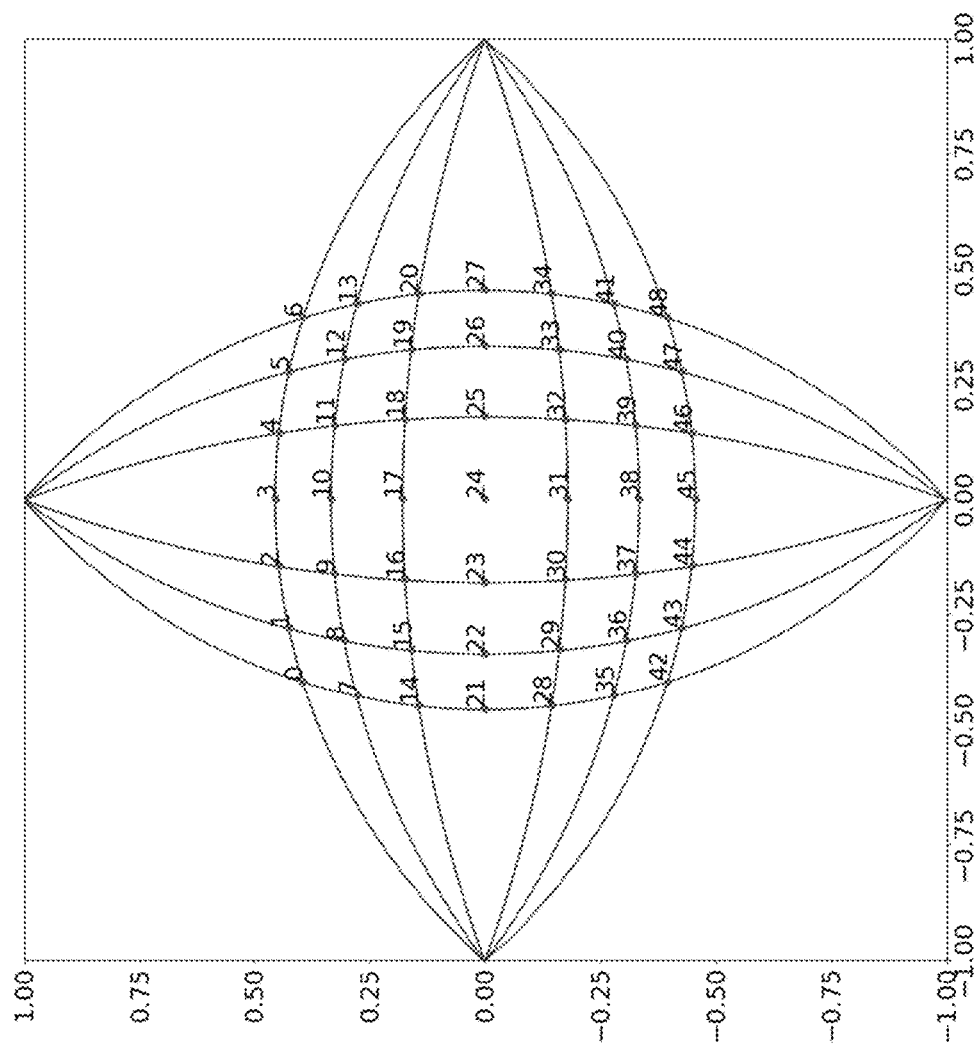
FIG. 15 illustrates an example of geodesics in accordance with an embodiment of the invention.

An example of geodesics in accordance with an embodiment of the invention is illustrated in FIG. 15. To draw the arcs to the right of the center, processes in accordance with many embodiments of the invention can select positive values for each $a_n$. The arcs to the left of the center can be found from the negatives of the values of $a_n$. In several embodiments, the upper and lower arcs can be found by simply swapping the x- and y-coordinates. Processes in accordance with a number of embodiments of the invention can identify the intersects of the geodesics as ideal keypoints. Identifying coordinates for the intersects in accordance with many embodiments of the invention can be performed in various ways, such as (but not limited to) built-in functionality in the Python NumPy library. In certain embodiments, these points are the theoretical ideal locations of the corners on a chessboard for some particular value of $a_3$.

Figure 16:
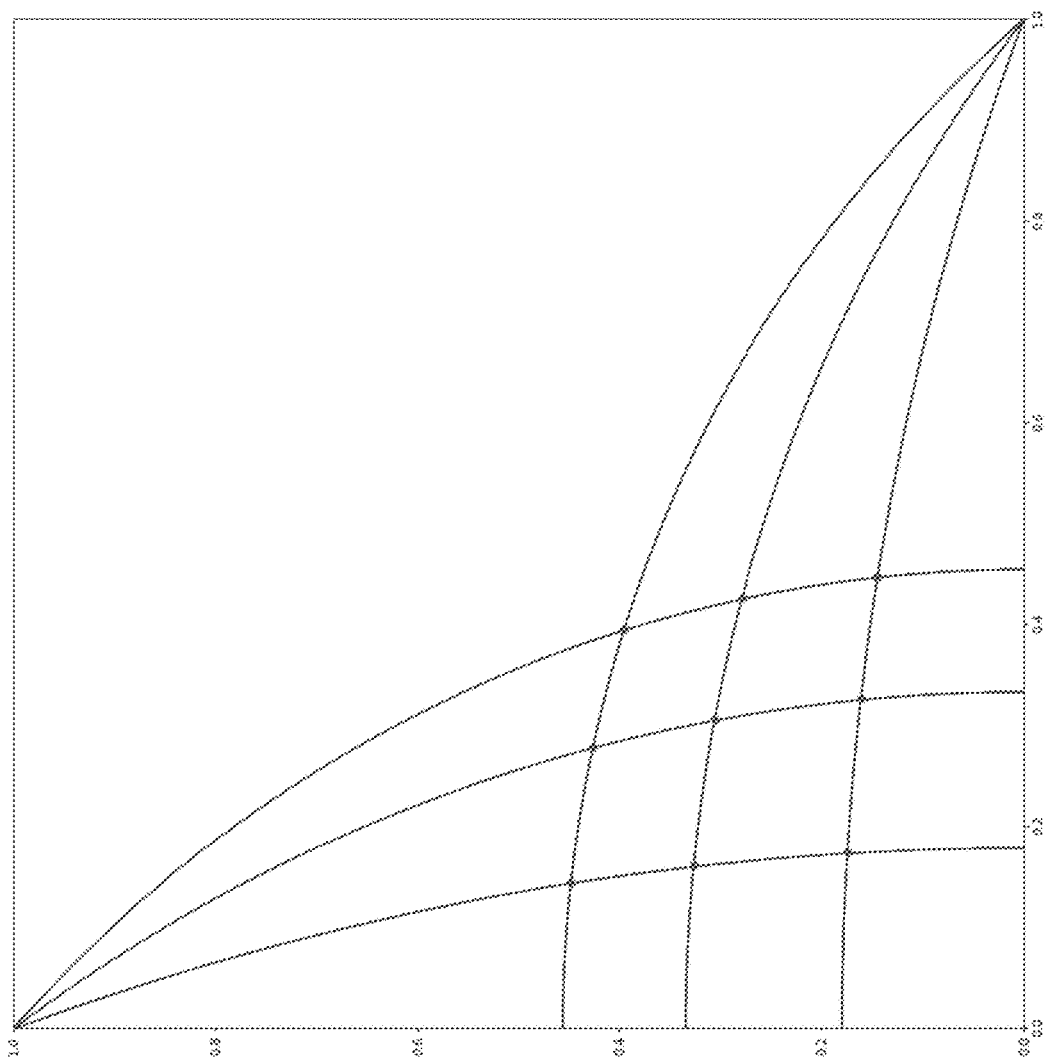
FIGS. 16 and 17 illustrate an example of geodesic intersects in a quadrant.
Figure 17:
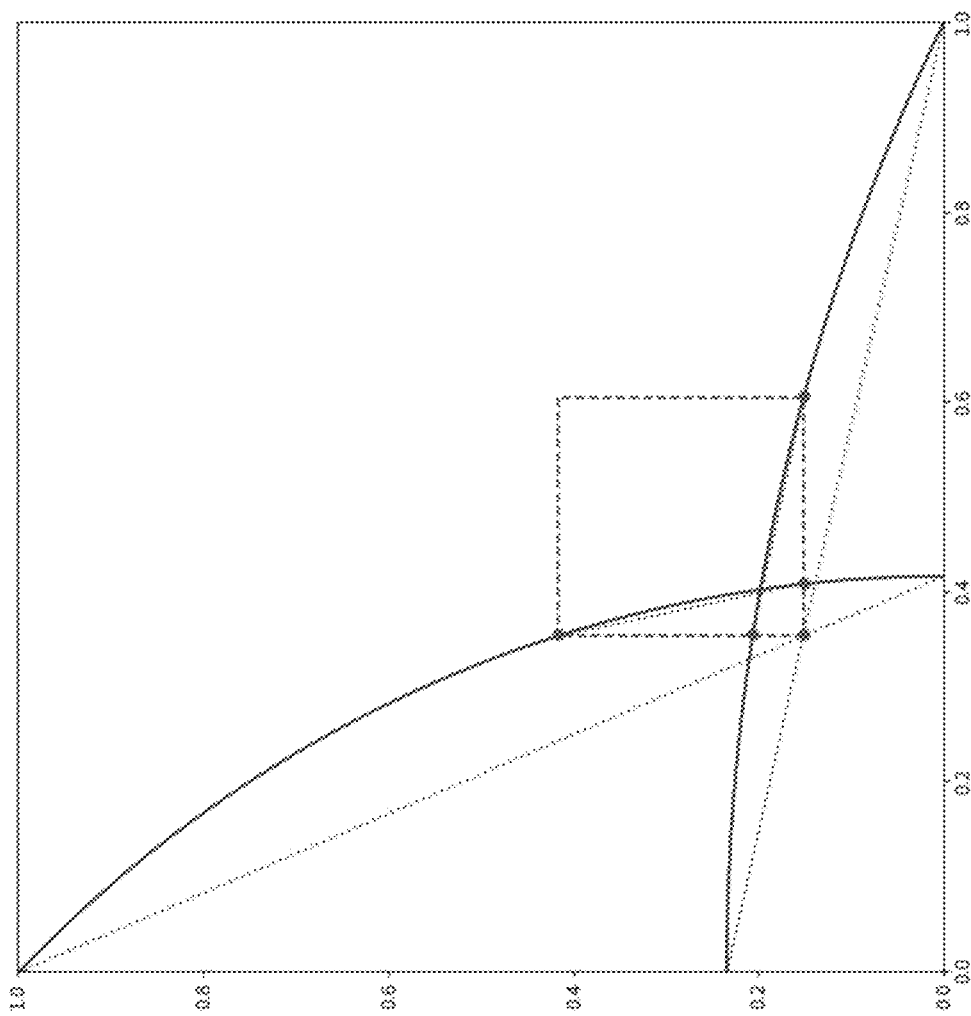

In a variety of embodiments, processes can be performed to find these intersects in a single quadrant of the image, since all four quadrants may be reflections of each other. Processes in accordance with some embodiments of the invention can look at a single quadrant and examine pairs of arcs to identify their intersects. An example of intersections in a quadrant are illustrated in FIGS. 16 and 17.

Defining $C_1(x)$ and $\tilde{C}_1(y)$ as the arc of the circle passing through the point (0,1) and $C_2(x)$ and $\tilde{C}_2(y)$ as the arc of the circle passing through the point (1,0), the equations of these arcs can be defined as:

$$C_1(x) = \sqrt{r_1^2 - (x - r'_1)^2} \quad C_2(x) = \sqrt{r_2^2 - x^2 - r'_n}$$

$$\tilde{C}_1(y) = \sqrt{r_1^2 - y^2 - r'_n} \quad \tilde{C}_2(y) = \sqrt{r_2^2 - (y - r'_2)^2}$$

The lines connecting the x- and y-intersects can be given by the point-slope formula and can be rewritten in parametric form.

Cartesian $$\ell_1(x) = \left(\frac{y_0 - y_1}{x_1 - x_0}\right)x + y_1$$

$$\ell_2(x) = \left(\frac{y_0 - y_2}{x_2 - x_0}\right)x + y_2$$

Parametric $$\langle x_0 + y_1 \rangle + s(x_1 - x_0, y_0 - y_1) \equiv \vec{p} + s\vec{u}$$

$$\langle x_0 + y_2 \rangle + t(x_2 - x_0, y_0 - y_2) \equiv \vec{q} + t\vec{v}$$

Finding the values of $s_0$ and $t_0$ where these two lines intersect amounts to setting $\vec{p} + s\vec{u} = \vec{q} + t\vec{v}$. This can provide a first approximation for where the two curves intersect. In some embodiments, this process can be repeated until the desired accuracy passes a predetermined threshold.

$$\vec{p} + s_0 \vec{u} = \vec{q} + t_0 \vec{v}$$

$$s_0 \vec{u} - t_0 \vec{v} = \vec{q} - \vec{p}$$

Writing this as a matrix equation:

$$s_0 \begin{bmatrix} x_1 - x_0 \\ y_0 - y_1 \end{bmatrix} - t_0 \begin{bmatrix} x_2 - x_0 \\ y_0 - y_2 \end{bmatrix} = s_0 \begin{bmatrix} x_0 - x_0 \\ y_2 - y_1 \end{bmatrix}$$

$$\begin{bmatrix} x_1 - x_0 & -(x_2 - x_0) \\ y_0 - y_1 & -(y_0 - y_2) \end{bmatrix} \begin{bmatrix} s_0 \\ t_0 \end{bmatrix} = \begin{bmatrix} 0 \\ y_2 - y_1 \end{bmatrix}$$

Solving for $\langle s_0, t_0 \rangle$:

$$\begin{bmatrix} s_0 \\ t_0 \end{bmatrix} = \begin{bmatrix} x_1 - x_0 & x_0 - x_2 \\ y_0 - y_1 & y_2 - y_0 \end{bmatrix}^{-1} \begin{bmatrix} 0 \\ y_2 - y_1 \end{bmatrix}$$

Using either $s_0$ or $t_0$, processes in accordance with certain embodiments of the invention can solve for the intersect of the two lines $\langle x'_0, y'_0 \rangle$.

$$\begin{bmatrix} x'_0 \\ y'_0 \end{bmatrix} = \begin{bmatrix} x_0 \\ y_1 \end{bmatrix} + s_0 \begin{bmatrix} x_1 - x_0 \\ y_0 - y_1 \end{bmatrix} = \begin{bmatrix} x_0 \\ y_2 \end{bmatrix} + t_0 \begin{bmatrix} x_2 - x_0 \\ y_0 - y_2 \end{bmatrix}$$

So, using the definitions of the equations for the circles, successively closer approximations to the intersects of the circles can be found using only the previous approximations as inputs. This becomes a Markov Process that converges very quickly to the point of intersect. In a number of embodiments, the entire calculation can be written in a single line matrix equation whose results are fed back into itself to produce the next approximation.

$$\begin{bmatrix} x'_0 \\ y'_0 \end{bmatrix} = \begin{bmatrix} x_0 \\ C_1(x_0) \end{bmatrix} +$$

$$\begin{bmatrix} 1 \\ 0 \end{bmatrix}^T \begin{bmatrix} \tilde{C}_1(y_0) - x_0 & x_0 - \tilde{C}_2(y_0) \\ y_0 - C_1(x_0) & C_2(x_0) - y_0 \end{bmatrix}^{-1} \begin{bmatrix} 0 \\ C_2(x_0) - C_1(x_0) \end{bmatrix} \begin{bmatrix} \tilde{C}_1(y_0) - x_0 \\ y_0 - C_1(x_0) \end{bmatrix}$$

After each iteration of this Markov Process, two sequences $\{a_n\}_{n \in \mathbb{N}}$ and $\{b_n\}_{n \in \mathbb{N}}$ can be defined as $a_n = x_n - x_{n-1}$ and $b_n = y_n - y_{n-1}$. These sequences will monotonically converge towards the point of intersect (A,B). In other words, the sequence of x or y values can be written as a sum of these differences.

$$(A, B) = \left( \sum_{i=0}^{\infty} a_i, \sum_{i=0}^{\infty} b_i \right)$$

These can be treated as partial sums.

$$(A_n, B_n) = \left( \sum_{i=0}^{n} x_i, \sum_{i=0}^{n} y_i \right)$$

To speed up the convergence of these sequences, in certain embodiments, the Shanks Transformation can be applied, which is defined as:

$$S(A_n) = \frac{A_{n+1}A_{n-1} - A_n^2}{A_{n+1} - 2A_n + A_{n-1}}$$

In numerous embodiments, convergence of this sequence can be further sped up through repeated applications of this transformation. For example, by computing five terms in each sequence (by running the Markov Process for five iterations), a higher-order Shanks Transform can be computed.

$$S^3(A_n) = S(S(S(A_n)))$$

In a variety of embodiments, this process can be repeated for each pair of curves in the quadrant and reflected about the axes to derive the points in all quadrants.

Mapping Source to Destination

In fisheye to equirectangular mapping, the independent variable is the destination coordinate while the dependent variable is the source coordinate. The fragment shader can take a destination pixel and decide where to look in the source image for color information. Sometimes, it may be necessary to run this process in reverse to determine where information for a source pixel will be mapped to in a destination image. Mapping source pixels to a destination in accordance with various embodiments of the invention can be used for various processes, such as (but not limited to) mapping ideal source pixels to ideal destination locations.

In a number of embodiments, mapping processes can involve many-to-one mappings of coordinates as there are many more pixels with color information in the destination than there are in the source. When asking where to look for color information, many destination pixels will get their information from the same source pixel. For a 180° fisheye image, almost 21.5% of the pixels will draw from the same source. There is no problem when a function is many-to-one like this, but the function is mathematically non-invertible. Processes in accordance with several embodiments of the invention can utilize a technique for performing a Reverse PolyMap lookup to compute corresponding destination locations for a source location.

In various embodiments, mapping processes can seek the $(a_f, b_f)$ pair in the destination for which $\hat{M}[(a_f, b_f)] = (x_f, y_f)$ where $\hat{M}$ is the PolyMap transformation and $(x_f, y_f)$ is the coordinate of the source location (e.g., keypoint). Processes in accordance with some embodiments of the invention can start at a point $\vec{g}_0 = \langle a_0, b_0 \rangle = \langle 0.5, 0.5 \rangle$. Since this is the center of the image, processes can move outward towards the desired coordinate. In numerous embodiments, processes can begin at other points in the image in accordance with the requirements of the application. Mapping processes in accordance with certain embodiments of the invention can iteratively move towards the desired coordinate until it determines a guess $\vec{g}_n = (a_n, b_n)$ for which $\hat{M}[(a_n, b_n)]$ is within a threshold value of the value $\vec{v}_f = \langle x_f, y_f \rangle$.

To do this, processes in accordance with some embodiments of the invention can compute the PolyMap transformation of each current guess $g_n$ and then compute the distance of the computed transformation from a desired destination $\vec{v}_f$. In numerous embodiments, processes can "move" the guess based on the computed distance (e.g., in the direction of and by the computed distance to the desired destination). Processes in accordance with a variety of embodiments of the invention can use various methods to compute the current error ($\epsilon$), such as (but not limited to) the "Traffic Metric". In certain embodiments, processes can set an error threshold (e.g., $\epsilon = 0.0001$) to determine when to stop iterating. Note that the particular value of $\epsilon$ can be selected to deliver subpixel precision. In numerous embodiments, the error threshold can be computed as:

$$\epsilon = \|\hat{M}[\vec{g}_n] - \vec{v}_f\|_T = \|\vec{\delta}\|_T = \|\langle \delta x, \delta y \rangle\|_T = |\delta x| + |\delta y|$$

Since $\hat{P}$ is the PolyMap transformation, define:

$$\vec{v}_n = \hat{M}[\vec{g}_n] \quad \vec{\delta}_n = \vec{v}_n - \vec{v}_f$$

The Reverse PolyMap lookup calculation in accordance with a number of embodiments of the invention can succinctly be written as:

$$\vec{g}_{n+1} = \vec{g}_n + (\hat{M}[\vec{g}_n] - \vec{v}_f) \quad \text{if}(\|\hat{M}[\vec{g}_n] - \vec{v}_f\|_T > \epsilon)$$

Figure 18:
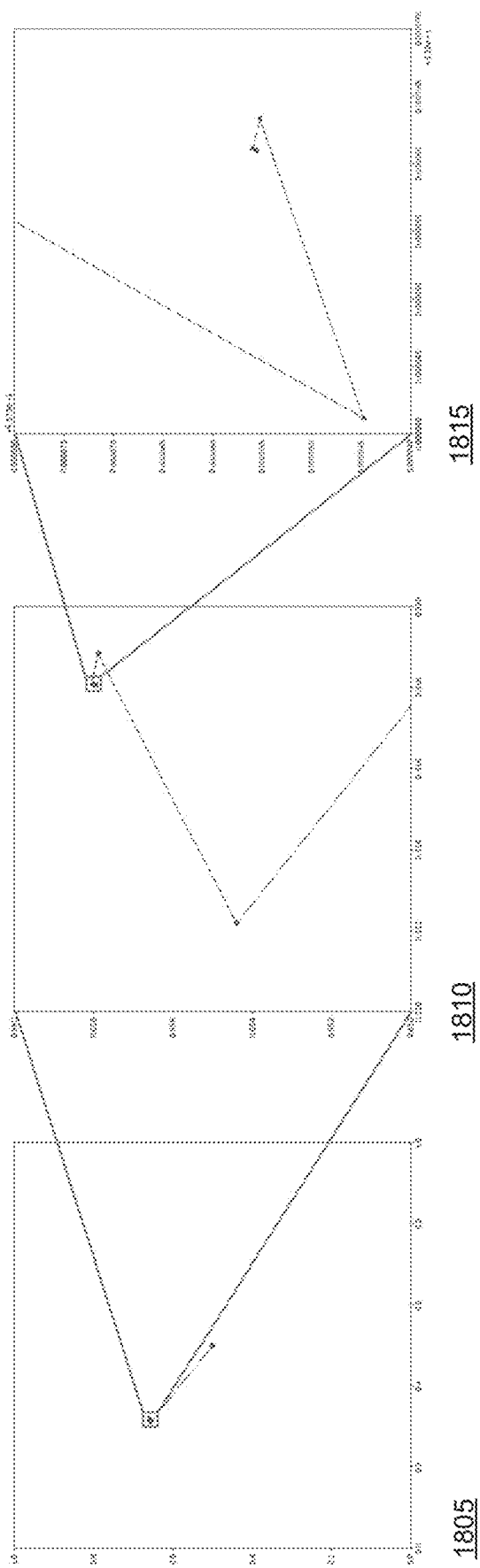
FIG. 18 illustrates results of an iterative search at various zoom levels in accordance with an embodiment of the invention.

This iterative procedure was tested on a 4K resolution image and computed for all points within the fisheye space. For all source coordinates, even with the requirement of $\epsilon < 10^{-4}$, this was met with $n \leq 4$. This means that it took no more than 4 iterations to surpass the requirements of the tolerance threshold. The results of an iterative search at various zoom levels in accordance with an embodiment of the invention are illustrated in three stages 1805-1815 of FIG. 18. In the first stage 1805, there is no zoom, while by the third iteration at 1815, the chart shows up to 6 decimals of accuracy.

In some embodiments, the threshold can be lowered significantly and a single calculation can be performed to get just as precise a result using an affine transformation of the points in the neighborhood of the "best guess". Coordinate systems can be defined in terms of either Fisheye Space as $\vec{f} = (x, y)$ or Equirectangular Space as $\vec{e} = (u, v)$. The PolyMap Transformation Operator can be defined as $\hat{M}$ and the Reverse PolyMap Operator as $\hat{R}$.

To select enough pixels from the fisheye circle to fill the equirectangular square, there will necessarily be a certain level of duplication. That is, the PolyMap function will need to select pixels from the source that have already been mapped to somewhere else in the destination.

This means that the PolyMap Operator is a many-to-one mapping and there will be occasions in which $\hat{M}(u_m, v_m) = \hat{M}(u_n, v_n) = (x_n, y_n)$. However, this is still a well-defined function on the positive semi-definite unit square. In various embodiments, fragment shader code on the GPU can evaluate the PolyMap operation for each pixel in the destination image to decide where to look in the fisheye source image (x,y) for the color information it will assign to the destination image at the location (u,v).

Naturally, this implies that the Reverse PolyMap Operator is a one-to-many mapping. As it is not well-defined, processes in accordance with various embodiments of the invention can use a reverse mapping (e.g., Reverse PolyMap) to localize to a single destination coordinate on the same unit square. Though the $\hat{R}$ Operator is not well defined, the forward and reverse mappings can be understood as $\hat{M} = \hat{R}^{-1}$ and $\hat{R} = \hat{M}^{-1}$.

Reverse lookups in accordance with some embodiments of the invention can localize the destination coordinate $\vec{g}_n = (u_n, v_n)$ such that $\hat{M}[\vec{g}_n]$ is within $\epsilon$ of $\vec{v}_f = (x_f, y_f)$. For greater precision, processes in accordance with many embodiments of the invention can continue iterating (e.g., with RPMLU) with a smaller threshold. However, processes in accordance with a number of embodiments of the invention can utilize an interpolation technique to deliver a sub-pixel localization in a single step.

At a close enough "zoom", the curvature of the fisheye map appears flat. That is, points in a small enough neighborhood around any point will transform under $\hat{M}$ in essentially the same manner. All of the points in that neighborhood will preserve their positions and spacings relative to one another. To do this, transformation operators from matrix algebra can be used: translation, scalar, and affine.

$$\hat{T} \equiv \begin{bmatrix} 1 & 0 & \alpha \\ 0 & 1 & \beta \\ 0 & 0 & 1 \end{bmatrix} \text{Translation Matrix}$$

$$\hat{S} \equiv \begin{bmatrix} \lambda_x & 0 & 0 \\ 0 & \lambda_y & 0 \\ 0 & 0 & 1 \end{bmatrix} \text{Scalar Matrix}$$

$$\hat{A} \equiv \begin{bmatrix} a & b & c \\ d & e & f \\ 0 & 0 & 1 \end{bmatrix} \text{Affine Transformation Matrix}$$

Processes in accordance with a variety of embodiments of the invention can use the affine operator in reverse ($\hat{A}^{-1}$) so that the parallelogram made by $P_1$, $P_2$, $P_3$, and $P_4$ can be mapped to the unit square with $P_4$ at the origin. Affine transformations can be used in accordance with a variety of embodiments of the invention because they are fast and accurate. Although many of the examples described herein affine transformations, one skilled in the art will recognize that other types of transformations can be used including (but not limited to) perspective transformation, without departing from this invention.

Figure 19:
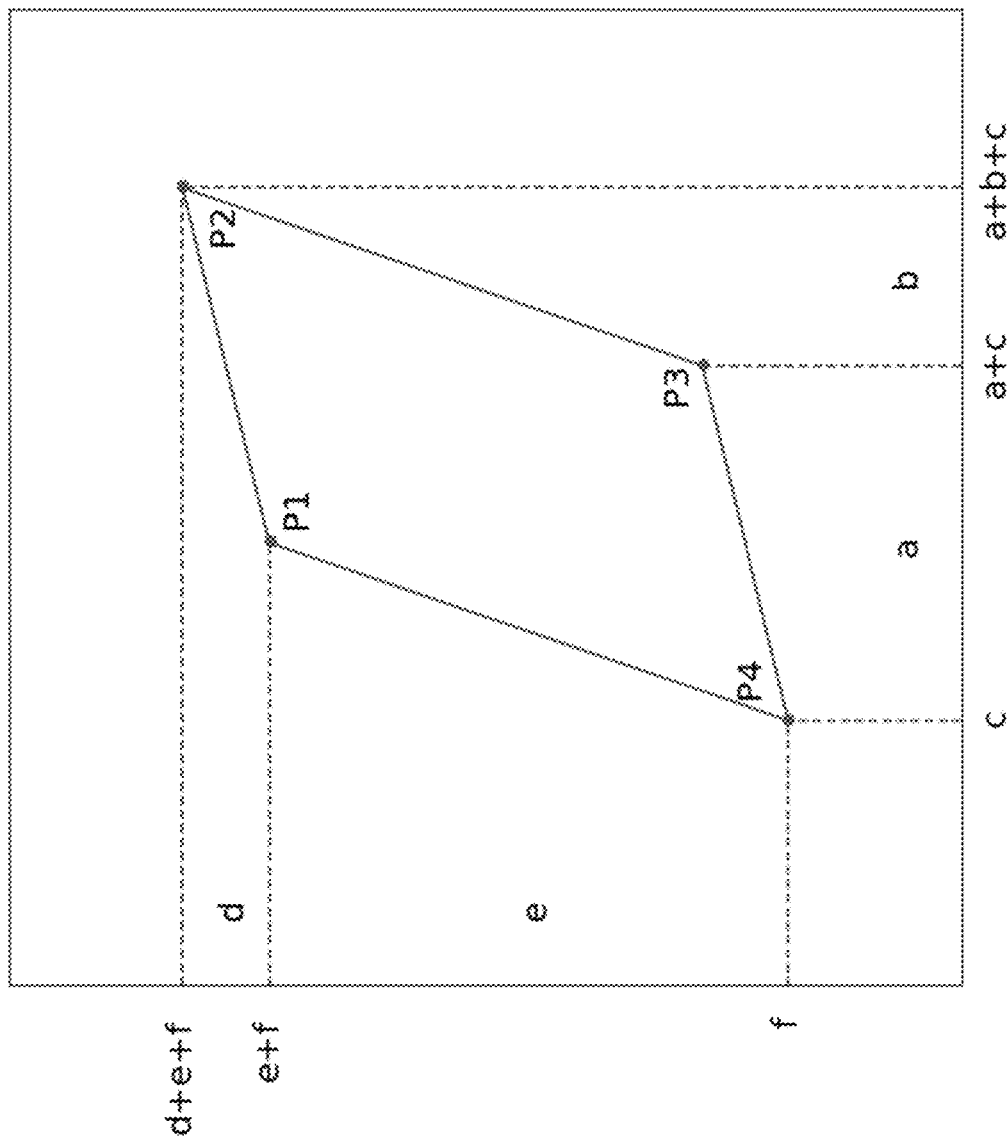
FIG. 19 illustrates variable values for reverse mapping of a parallelogram to a unit square in accordance with an embodiment of the invention.

The variable values (e.g., a, b, c, d, e and f) for reverse mapping of a parallelogram to a unit square in accordance with an embodiment of the invention is illustrated in FIG. 19.

Combining the $\hat{T}$, $\hat{S}$, and $\hat{A}^{-1}$ operators:

$$\hat{T}\hat{S}\hat{A}^{-1} \equiv \begin{bmatrix} \lambda_x & 0 & \alpha \\ 0 & \lambda_y & \beta \\ 0 & 0 & 1 \end{bmatrix} \begin{bmatrix} a & b & c \\ d & e & f \\ 0 & 0 & 1 \end{bmatrix}$$

Viewing the combination as one operator performing three tasks, first, the $\hat{A}^{-1}$ operator will map the four corners to a unit square. Second, the $\hat{S}$ operator will rescale that unit square so that it is $\lambda_x$ units wide and $\lambda_y$ units tall. Finally, the $\hat{T}$ operator will shift the bottom-left corner to the point $(\alpha, \beta)$.

In a number of embodiments, processes can compute the PolyMap Transformation of the four corners around the result of the RPMLU ($\vec{P}'_5$) at a distance of $\epsilon$.

Figure 20:
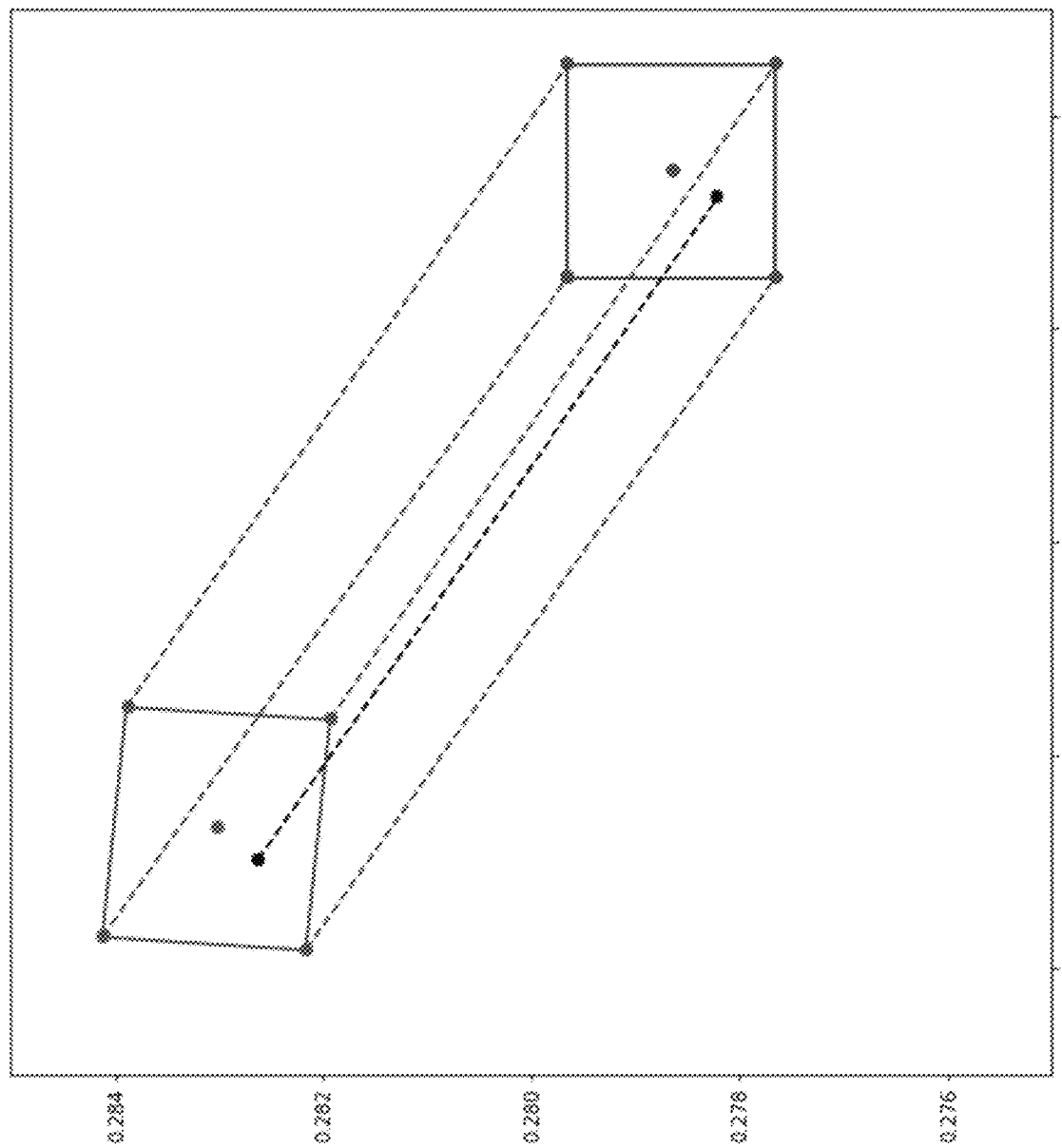
FIG. 20 illustrates a visualization of a mapping between xy-space and uv-space.
Figure 21:
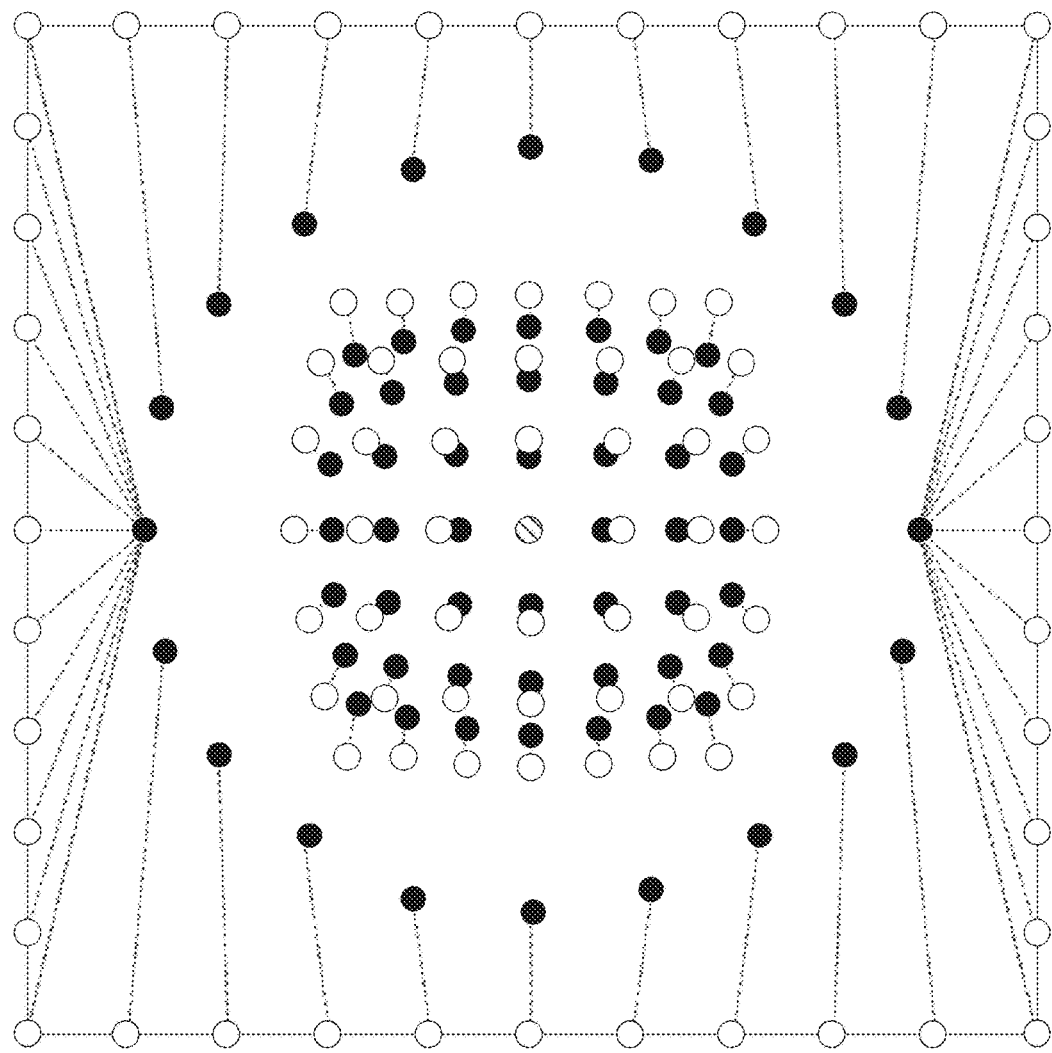
FIG. 21 illustrates an example of mappings between real source points (black) and ideal destination points (white) in accordance with an embodiment of the invention.

$(u_1, v_1) = \vec{P}'_1 = \vec{P}'_5 + (-\epsilon, \epsilon)$ $(x_1, y_1) = \vec{P}_1 = \hat{M}[\vec{P}'_1]$ $(u_2, v_2) = \vec{P}'_2 = \vec{P}'_5 + (\epsilon, \epsilon)$ $(x_2, y_2) = \vec{P}_2 = \hat{M}[\vec{P}'_2]$ $(u_3, v_3) = \vec{P}'_3 = \vec{P}'_5 + (\epsilon, -\epsilon)$ $(x_3, y_3) = \vec{P}_3 = \hat{M}[\vec{P}'_3]$ $(u_4, v_4) = \vec{P}'_4 = \vec{P}'_5 + (-\epsilon, -\epsilon)$ $(x_4, y_4) = \vec{P}_4 = \hat{M}[\vec{P}'_4]$ $(u_5, v_5) = \vec{P}'_5$ $(x_5, y_5) = \vec{P}_5 = \hat{M}[\vec{P}'_5]$ Based on the image above, define:

$a = x_2 - x_1$ $d = y_2 - y_1$ $b = x_2 - x_3$ $e = y_2 - y_3$ $c = x_4$ $f = y_4$ $\alpha = u_5 - \epsilon$ $\lambda_x = 2\epsilon$ $\beta = v_5 - \epsilon$ $\lambda_y = 2\epsilon$ A visualization of a mapping between xy-space and uv-space is illustrated in FIG. 20. In this example, the upper-left parallelogram in xy-space is mapped to the lower-right square in uv-space. The dots in the centers of each quadrilateral were the starting points. Starting points in accordance with many embodiments of the invention can be determined as the result of the RPMLU search. Such a search can determine a point "close" to the desired point. This is represented as a black line that connects $\vec{e}$ with $\vec{f}$. Now, without having to perform the actual mapping of the 4 corner points, the desired point ($\vec{e}$) can be very precisely localized. Since all of the points around $\vec{f}$ move together and the way that those points move is known, processes in accordance with several embodiments of the invention can map $\vec{f}$ to its destination using the operator defined above.

The power of using this combined operator comes from the fact that the PolyMap function cannot be computed in reverse. That is, there is no Reverse PolyMap function that takes a point in the fisheye image (xy-space) and returns what point it corresponds to in the equirectangular image (uv-space). To get around this, processes in accordance with many embodiments of the invention can use RPMLU to find a point that is simply close to the desired point and simply observe how all of the points around it map back and forth. This can be used to create an operator that can take an xy-coordinate as input and can output a desired uv-coordinate.

Identifying Boundary Points

In addition to the keypoints provided by calibration patterns, processes in accordance with a number of embodiments of the invention can supplement the identified keypoints with boundary points. Boundary points in accordance with a number of embodiments of the invention can include a set of points along each edge of the destination coordinate system and/or a set of points along the ring at 180° in the fisheye coordinate system.

In a number of embodiments, the set of boundary points in the fisheye space can be mapped to the set of boundary points in equirectangular space. For example, processes in accordance with a number of embodiments of the invention may select a number (e.g., 11) of equally spaced points along each edge of the destination as boundary points. Alternatively, or conjunctively, processes in accordance with a variety of embodiments of the invention can select a number of equally spaced points along the ring at 180° in a source image. In certain embodiments, boundary points may be added to ideal destination arrays or real source arrays.

Processes in accordance with some embodiments of the invention can add corresponding points to the real source or ideal destination arrays. For example, processes in accordance with a number of embodiments of the invention can compute PolyMap values for boundary points from an ideal destination array and append those (e.g., 40 or 10 per side) points to a real source array. In certain embodiments, processes can compute Reverse PolyMap values for boundary points from a real source array and append those points to an ideal destination array.

An example of mappings between real source points (black) and ideal destination points (white) in accordance with an embodiment of the invention is illustrated in FIG.

21. In this example, lines are used to indicate the relationship between corresponding source and destination points. In this example, the set of real source corners is denser than the set of ideal destination corners. This is because the data that generated this came from a camera with a 220° FOV. The circle of red points lies on the ring at 180°. The ring of points is mapped to the square on the boundary while the internal points are all mapped to their respective theoretical ideal destinations. In this way, processes in accordance with many embodiments of the invention can handle interior behavior using the mapping between corresponding internal points, while the behavior at the boundary can be handled by effectively stitching the circumferential boundary points to the perimeter boundary points. In many embodiments, the mapping can be smoothed by using a least-squares regression to generate the actual PolyMap coefficients for data from a specific lens.

Determining Term Coefficients

In some embodiments, PolyMap methods of image dewarping can take pixel color values from coordinate (x,y) in the source image and paint them at new coordinates (u,v) in the destination image. For each pixel in the destination uv-space, the GPU in accordance with numerous embodiments of the invention can evaluate two separate functions to select the coordinates in xy-space from which to gather the color information. One function $f(u,v)$ computes the x-coordinate, while the other function $g(u,v)$ computes the y-coordinate.

The mapping $(x,y) \mapsto (u,v)$ can then be represented as $\hat{u}+i\hat{v}=f(x,y)+ig(x,y)$ where $i^2=-1$. The problem can then be split into real and imaginary parts so that $\hat{u}=f(x,y)$ and $\hat{v}=g(x,y)$. This method can be particularly useful when the collection of source and destination points are not collinear or are otherwise scattered across the coordinate system, that is to say, the known values are sparse and/or the pixel map is incomplete or has missing information and unassigned values.

Working first with the u value, the form of the function used by the PolyMap script is:

$a = a_{11}y^4 + a_{12}y^2 + a_{13}$ $b = a_{21}y^4 + a_{22}y^2 + a_{23}$ $c = a_{31}y^4 + a_{32}y^2 + a_{33}$ $d = \delta_x$ $u = ax^5 + bx^3 + cx + d$ Making the indicated substitutions $u = (a_{11}y^4 + a_{12}y^2 + a_{13})x^5 + (a_{21}y^4 + a_{22}y^2 + a_{23})x^3 + (a_{31}y^4 + a_{32}y^2 + a_{33})x + \delta_x$ This can be expanded to show the full form of the polynomial.

$f(x,y) = a_{11}x^5y^4 + a_{12}x^5y^2 + a_{13}x^5 + a_{21}x^3y^4 + a_{22}x^3y^2 + a_{23}x^3 + a_{31}xy^4 + a_{32}xy^2 + a_{33}x + \delta_x$ The problem to be solved here can be stated as follows: Given a set of coordinate pairs $\{x_n, y_n\}$ with $n=0 \ldots N$, $n \in \mathbb{Z}$, find the set of constants $\{a_{ij}, \delta_x\} \in \mathbb{R}$ so as to minimize the quantity:

$$K = \sum_{n=0}^{N} [f(\{a_{ij}, \delta\}; x_n, y_n) - u_n]^2$$

To do this, processes in accordance with certain embodiments of the invention can take partial derivatives of the quantity K with respect to each of the unknown parameters $\{a_{ij}, \delta_x\}$ and set them equal to zero to find the extrema (minimum in this case). The leading values of 2 can be discarded since all equations are set equal to 0.

$$\frac{\partial K}{\partial a_{11}} = 0 = \sum [2 \, x_n^5 y_n^4 (f(\{a_{ij}, \delta_x\}; x_n, y_n) - u_n)]$$

$$\frac{\partial K}{\partial a_{12}} = 0 = \sum [2 \, x_n^5 y_n^2 (f(\{a_{ij}, \delta_x\}; x_n, y_n) - u_n)]$$

$$\vdots$$

$$\frac{\partial K}{\partial \delta_x} = 0 = \sum [f(\{a_{ij}, \delta_x\}; x_n, y_n) - u_n]$$

These can be combined and expressed in a matrix system of equations as $\hat{C}_x \vec{h}_x = \vec{w}$.

$$\sum_{n=0}^{N} \begin{bmatrix} x_n^{10}y_n^8 & x_n^{10}y_n^6 & x_n^{10}y_n^4 & x_n^8y_n^8 & x_n^8y_n^6 & x_n^8y_n^4 & x_n^6y_n^8 & x_n^6y_n^6 & x_n^6y_n^4 & x_n^5y_n^4 \\ x_n^{10}y_n^6 & x_n^{10}y_n^4 & x_n^{10}y_n^2 & x_n^8y_n^6 & x_n^8y_n^4 & x_n^8y_n^2 & x_n^6y_n^6 & x_n^6y_n^4 & x_n^6y_n^2 & x_n^5y_n^2 \\ x_n^{10}y_n^4 & x_n^{10}y_n^2 & x_n^{10} & x_n^8y_n^4 & x_n^8y_n^2 & x_n^8 & x_n^6y_n^4 & x_n^6y_n^2 & x_n^6 & x_n^5 \\ x_n^8y_n^8 & x_n^8y_n^6 & x_n^8y_n^4 & x_n^6y_n^8 & x_n^6y_n^6 & x_n^6y_n^4 & x_n^4y_n^8 & x_n^4y_n^6 & x_n^4y_n^4 & x_n^3y_n^4 \\ x_n^8y_n^6 & x_n^8y_n^4 & x_n^8y_n^2 & x_n^6y_n^6 & x_n^6y_n^4 & x_n^6y_n^2 & x_n^4y_n^6 & x_n^4y_n^4 & x_n^4y_n^2 & x_n^3y_n^2 \\ x_n^8y_n^4 & x_n^8y_n^2 & x_n^8 & x_n^6y_n^4 & x_n^6y_n^2 & x_n^6 & x_n^4y_n^4 & x_n^4y_n^2 & x_n^4 & x_n^3 \\ x_n^6y_n^8 & x_n^6y_n^6 & x_n^6y_n^4 & x_n^4y_n^8 & x_n^4y_n^6 & x_n^4y_n^4 & x_n^2y_n^8 & x_n^2y_n^6 & x_n^2y_n^4 & x_ny_n^4 \\ x_n^6y_n^6 & x_n^6y_n^4 & x_n^6y_n^2 & x_n^4y_n^6 & x_n^4y_n^4 & x_n^4y_n^2 & x_n^2y_n^6 & x_n^2y_n^4 & x_n^2y_n^2 & x_ny_n^2 \\ x_n^6y_n^4 & x_n^6y_n^2 & x_n^6 & x_n^4y_n^4 & x_n^4y_n^2 & x_n^4 & x_n^2y_n^4 & x_n^2y_n^2 & x_n^2 & x_n \\ x_n^5y_n^4 & x_n^5y_n^2 & x_n^5 & x_n^3y_n^4 & x_n^3y_n^2 & x_n^3 & x_ny_n^4 & x_ny_n^2 & x_n & 1 \end{bmatrix} \begin{bmatrix} a_{11} \\ a_{12} \\ a_{13} \\ a_{21} \\ a_{22} \\ a_{23} \\ a_{31} \\ a_{32} \\ a_{33} \\ \delta_x \end{bmatrix} = \sum_{n=0}^{N} \begin{bmatrix} x_n^5 y_n^4 u_n \\ x_n^5 y_n^2 u_n \\ x_n^5 u_n \\ x_n^3 y_n^4 u_n \\ x_n^3 y_n^2 u_n \\ x_n^3 u_n \\ x_n y_n^4 u_n \\ x_n y_n^2 u_n \\ x_n u_n \\ u_n \end{bmatrix}$$

In various embodiments, a similar process can be conducted to find the values of in $\vec{v}$. For simplicity, processes can swap the exponents on the x's and y's everywhere and then swap the indices in the coefficient vector (the $b_{mn}$ terms).

$$\sum_{n=0}^{N} \begin{bmatrix} y_n^{10}x_n^8 & y_n^{10}x_n^6 & y_n^{10}x_n^4 & y_n^8x_n^8 & y_n^8x_n^6 & y_n^8x_n^4 & y_n^6x_n^8 & y_n^6x_n^6 & y_n^6x_n^4 & y_n^5x_n^4 \\ y_n^{10}x_n^6 & y_n^{10}x_n^4 & y_n^{10}x_n^2 & y_n^8x_n^6 & y_n^8x_n^4 & y_n^8x_n^2 & y_n^6x_n^6 & y_n^6x_n^4 & y_n^6x_n^2 & y_n^5x_n^2 \\ y_n^{10}x_n^4 & y_n^{10}x_n^2 & y_n^{10} & y_n^8x_n^4 & y_n^8x_n^2 & y_n^8 & y_n^6x_n^4 & y_n^6x_n^2 & y_n^6 & y_n^5 \\ y_n^8x_n^8 & y_n^8x_n^6 & y_n^8x_n^4 & y_n^6x_n^8 & y_n^6x_n^6 & y_n^6x_n^4 & y_n^4x_n^8 & y_n^4x_n^6 & y_n^4x_n^4 & y_n^3x_n^4 \\ y_n^8x_n^6 & y_n^8x_n^4 & y_n^8x_n^2 & y_n^6x_n^6 & y_n^6x_n^4 & y_n^6x_n^2 & y_n^4x_n^6 & y_n^4x_n^4 & y_n^4x_n^2 & y_n^3x_n^2 \\ y_n^8x_n^4 & y_n^8x_n^2 & y_n^8 & y_n^6x_n^4 & y_n^6x_n^2 & y_n^6 & y_n^4x_n^4 & y_n^4x_n^2 & y_n^4 & y_n^3 \\ y_n^6x_n^8 & y_n^6x_n^6 & y_n^6x_n^4 & y_n^4x_n^8 & y_n^4x_n^6 & y_n^4x_n^4 & y_n^2x_n^8 & y_n^2x_n^6 & y_n^2x_n^4 & y_nx_n^4 \\ y_n^6x_n^6 & y_n^6x_n^4 & y_n^6x_n^2 & y_n^4x_n^6 & y_n^4x_n^4 & y_n^4x_n^2 & y_n^2x_n^6 & y_n^2x_n^4 & y_n^2x_n^2 & y_nx_n^2 \\ y_n^6x_n^4 & y_n^6x_n^2 & y_n^6 & y_n^4x_n^4 & y_n^4x_n^2 & y_n^4 & y_n^2x_n^4 & y_n^2x_n^2 & y_n^2 & y_n \\ y_n^5x_n^4 & y_n^5x_n^2 & y_n^5 & y_n^3x_n^4 & y_n^3x_n^2 & y_n^3 & y_nx_n^4 & y_nx_n^2 & y_n & 1 \end{bmatrix} \begin{bmatrix} b_{11} \\ b_{21} \\ b_{31} \\ b_{12} \\ b_{22} \\ b_{32} \\ b_{13} \\ b_{23} \\ b_{33} \\ \delta_y \end{bmatrix} = \sum_{n=0}^{N} \begin{bmatrix} y_n^5 x_n^4 u_n \\ y_n^5 x_n^2 u_n \\ y_n^5 u_n \\ y_n^3 x_n^4 u_n \\ y_n^3 x_n^2 u_n \\ y_n^3 u_n \\ y_n x_n^4 u_n \\ y_n x_n^2 u_n \\ y_n u_n \\ u_n \end{bmatrix}$$

These can be expressed as $\hat{C}_x \vec{h}_x = \vec{w}$ and $\hat{C}_y \vec{h}_y = \vec{v}$. These can be solved in the usual way as long as $\hat{C}$ is non-singular. Because this represents a smooth mapping, this will not be of concern.

More specifically, the coefficient vector $\vec{h}_x$, whose values are the desired PolyMap coefficients, can be computed by multiplying the vector $\vec{v}$ by the inverse of the matrix $\hat{C}_x$.

$$\hat{C}_x \vec{h}_x = \vec{w}$$

$$(\hat{C}_x^{-1} \hat{C}_x) \vec{h}_x = \hat{C}_x^{-1} \vec{w}$$

$$\vec{h}_x = \hat{C}_x^{-1} \vec{w}$$

In the same way:

$$\vec{h}_y = \hat{C}_y^{-1} \vec{v}$$

$\delta_x$ and $\delta_y$ should both be equal to exactly 0.5, since (0.5,0.5) is the center of the image. Processes in accordance with many embodiments of the invention can determine the PolyMap coefficients needed to properly map the real source keypoints to their ideal destination coordinates from the arrays $\vec{h}_x$ and $\vec{h}_y$.

Systems for Calibrating Image Capture
Image Capture Calibration System

Figure 22:
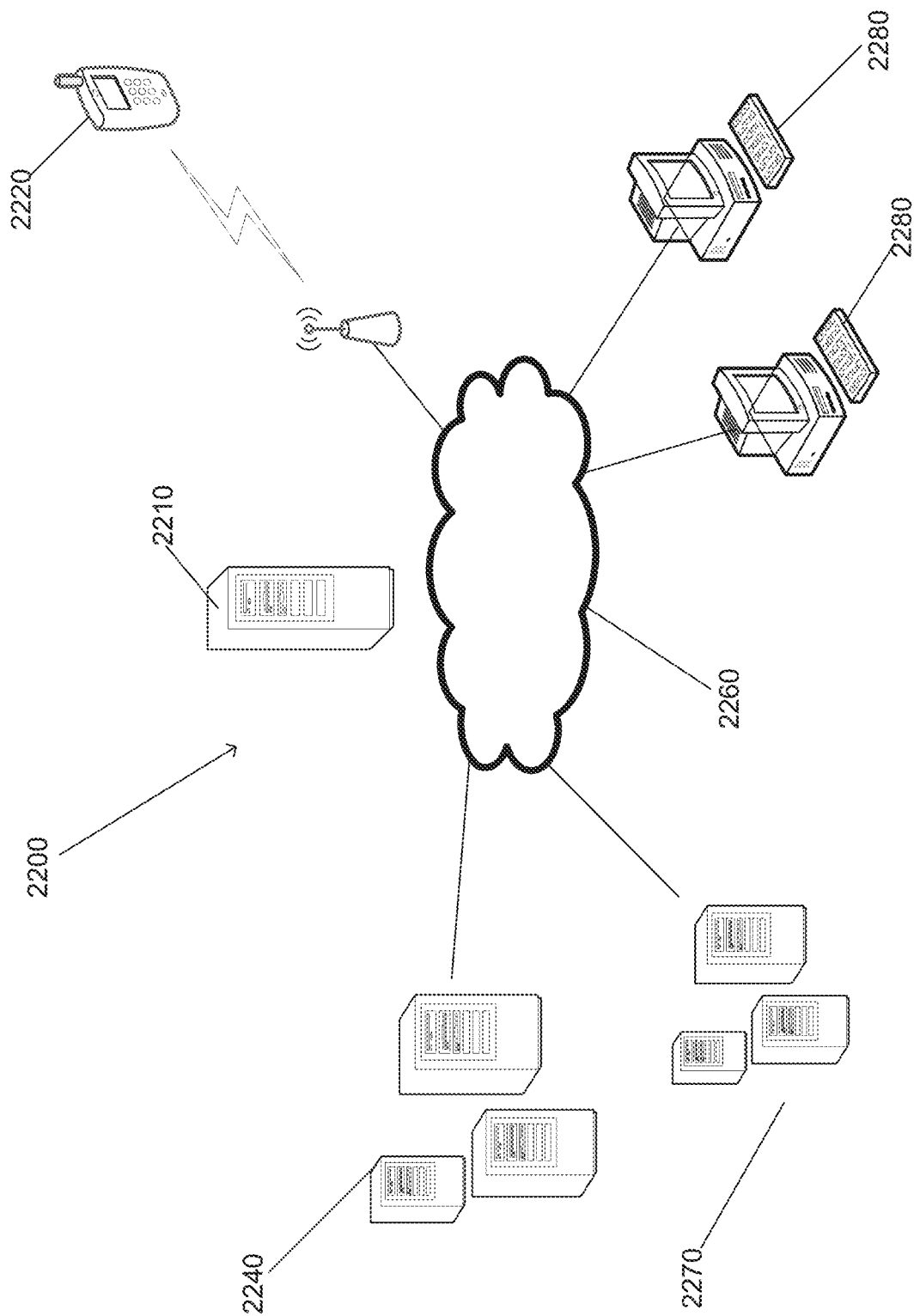
FIG. 22 illustrates an example of an image capture calibration system that calibrates image capture in accordance with an embodiment of the invention.

An example of an image capture calibration system that calibrates image capture in accordance with an embodiment of the invention is illustrated in FIG. 22. Network 2200 includes a communications network 2260. The communications network 2260 is a network such as the Internet that allows devices connected to the network 2260 to communicate with other connected devices. Server systems 2210, 2240, and 2270 are connected to the network 2260. Each of the server systems 2210, 2240, and 2270 is a group of one or more servers communicatively connected to one another via internal networks that execute processes that provide cloud services to users over the network 2260. One skilled in the art will recognize that an image capture calibration system may exclude certain components and/or include other components that are omitted for brevity without departing from this invention.

For purposes of this discussion, cloud services are one or more applications that are executed by one or more server systems to provide data and/or executable applications to devices over a network. The server systems 2210, 2240, and 2270 are shown each having three servers in the internal network. However, the server systems 2210, 2240 and 2270 may include any number of servers and any additional number of server systems may be connected to the network 2260 to provide cloud services. In accordance with various embodiments of this invention, an image capture calibration system that uses systems and methods that calibrate image capture in accordance with an embodiment of the invention may be provided by a process being executed on a single server system and/or a group of server systems communicating over network 2260.

Users may use personal devices 2280 and 2220 that connect to the network 2260 to perform processes that calibrate image capture in accordance with various embodiments of the invention. In the shown embodiment, the personal devices 2280 are shown as desktop computers that are connected via a conventional "wired" connection to the network 2260. However, the personal device 2280 may be a desktop computer, a laptop computer, a smart television, an entertainment gaming console, or any other device that connects to the network 2260 via a "wired" connection. The mobile device 2220 connects to network 2260 using a wireless connection. A wireless connection is a connection that uses Radio Frequency (RF) signals, Infrared signals, or any other form of wireless signaling to connect to the network 2260. In the example of this figure, the mobile device 2220 is a mobile telephone. However, mobile device 2220 may be a mobile phone, Personal Digital Assistant (PDA), a tablet, a smartphone, or any other type of device that connects to network 2260 via wireless connection without departing from this invention.

As can readily be appreciated the specific computing system used to calibrate image capture is largely dependent upon the requirements of a given application and should not be considered as limited to any specific computing system(s) implementation.

Image Capture Calibration Element

Figure 23:
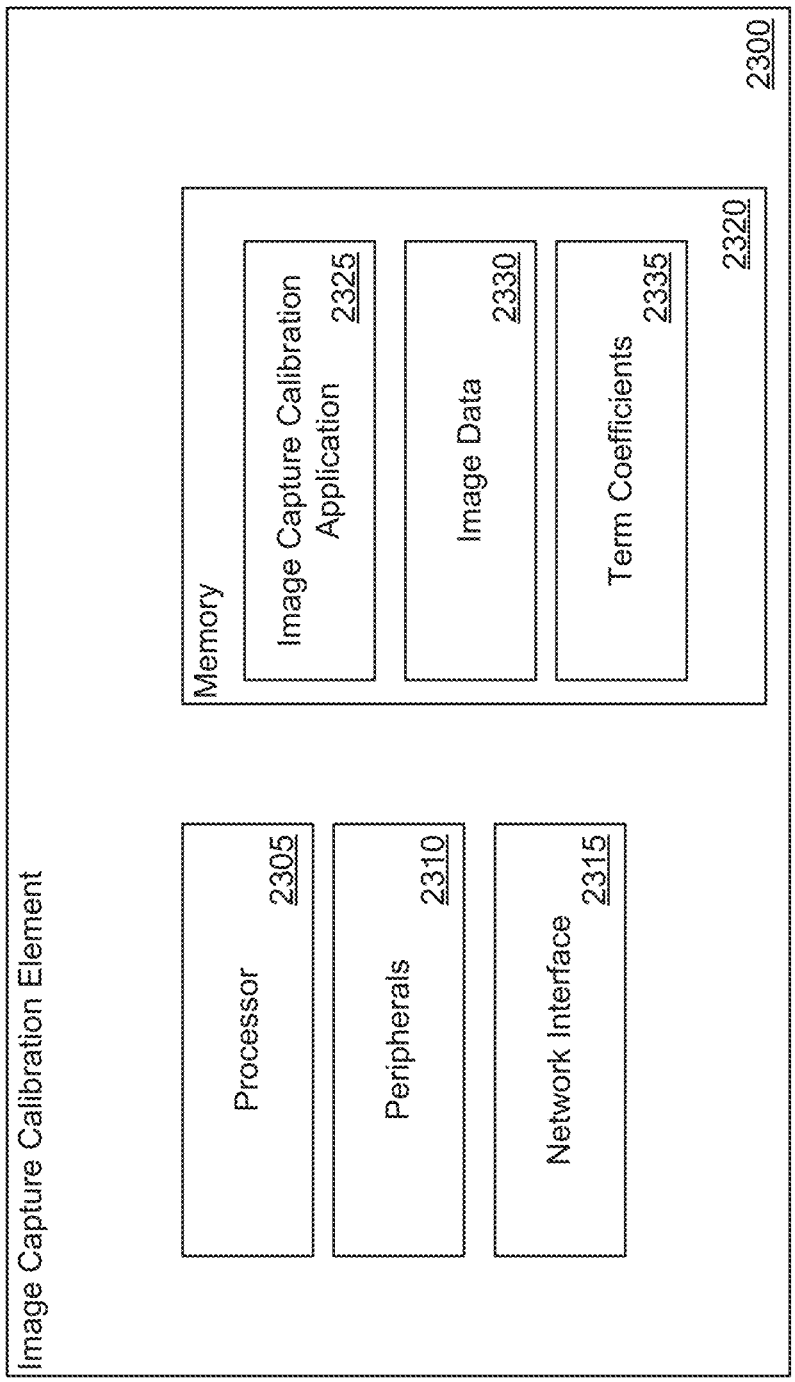
FIG. 23 illustrates an example of an image capture calibration element that executes instructions to perform processes that calibrate image capture in accordance with an embodiment of the invention.

An example of an image capture calibration element that executes instructions to perform processes that calibrate image capture in accordance with an embodiment of the invention is illustrated in FIG. 23. Image capture calibration elements in accordance with many embodiments of the invention can include (but are not limited to) one or more of mobile devices, cameras, and/or computers. Image capture calibration element 2300 includes processor 2305, peripherals 2310, network interface 2315, and memory 2320. One skilled in the art will recognize that an image capture calibration element may exclude certain components and/or include other components that are omitted for brevity without departing from this invention.

The processor 2305 can include (but is not limited to) a processor, microprocessor, controller, or a combination of processors, microprocessor, and/or controllers that performs instructions stored in the memory 2320 to manipulate data stored in the memory. Processor instructions can configure the processor 2305 to perform processes in accordance with certain embodiments of the invention.

Peripherals 2310 can include any of a variety of components for capturing data, such as (but not limited to) cameras, displays, and/or sensors. In a variety of embodiments, peripherals can be used to gather inputs and/or provide outputs. Image capture calibration element 2300 can utilize network interface 2315 to transmit and receive data over a network based upon the instructions performed by processor 2305. Peripherals and/or network interfaces in accordance with many embodiments of the invention can be used to gather inputs that can be used to calibrate image capture.

Memory 2320 includes an image capture calibration application 2325, image data 2330, and term coefficients 2335. Image capture calibration applications in accordance with several embodiments of the invention can be used to calibrate image capture.

Image data in accordance with a variety of embodiments of the invention can include (but is not limited to) video, images, etc. In some embodiments, image data can be used to calibrate and compute term coefficients for dewarping images captured with a given lens.

In several embodiments, term coefficients can store computed coefficients for one or more lenses, where the term coefficients can be used to dewarp images and/or perform reverse lookups. Processes for computing term coefficients in accordance with various embodiments of the invention are described throughout this description.

Although a specific example of an image capture calibration element 2300 is illustrated in this figure, any of a variety of image capture calibration elements can be utilized to perform processes for image capture calibration similar to those described herein as appropriate to the requirements of specific applications in accordance with embodiments of the invention.

Image Capture Calibration Application

Figure 24:
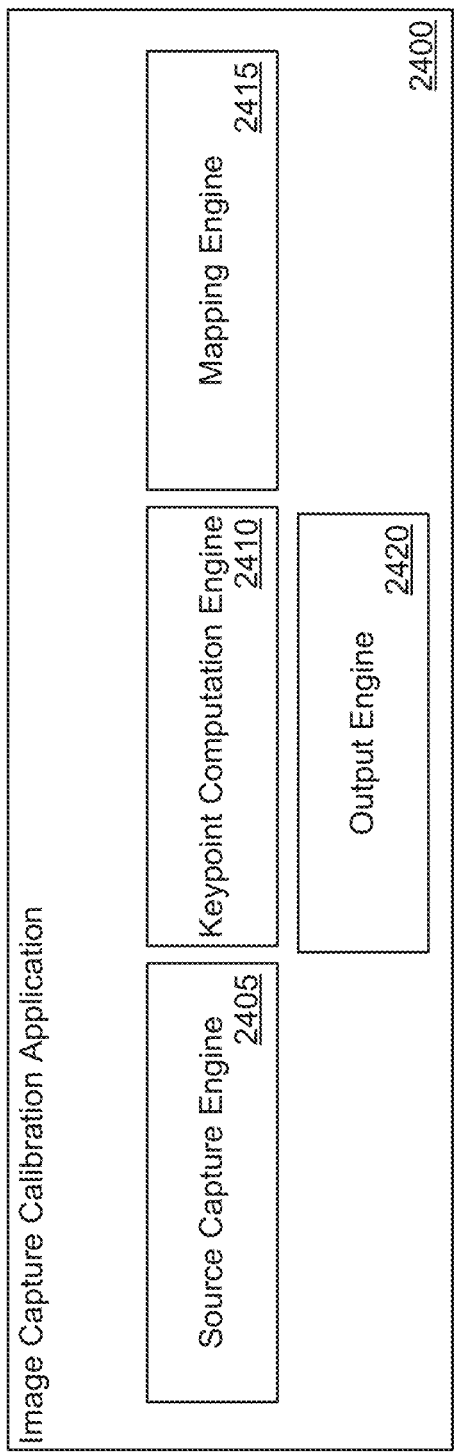
FIG. 24 illustrates an example of an image capture calibration application for image capture calibration in accordance with an embodiment of the invention.

An example of an image capture calibration application for image capture calibration in accordance with an embodiment of the invention is illustrated in FIG. 24. Image capture calibration application 2400 includes source capture engine 2405, keypoint computation engine 2410, mapping engine 2415, and output engine 2420. One skilled in the art will recognize that an image capture calibration application may exclude certain components and/or include other components that are omitted for brevity without departing from this invention.

Source capture engines in accordance with a variety of embodiments of the invention can be used to capture source images from a camera. In certain embodiments, source capture engines can provide a user interface to enable a user to capture an image of a calibration pattern that meets a set of criteria, such as (but not limited to) centered, not tilted, not skewed, etc. Source capture engines in accordance with many embodiments of the invention can detect keypoints in an image and use the detected keypoints to determine whether a captured source image is to be used for calibration processes.

In numerous embodiments, keypoint computation engines can compute keypoints for source and/or destination images. Keypoint computation engines in accordance with certain embodiments of the invention can compute ideal source points based on real source points using geodesics. In a number of embodiments, keypoint computation engines can identify boundary keypoints for source and/or destination images using various processes, such as (but not limited to) PolyMap operations, Reverse PolyMap operations, etc.

Mapping engines in accordance with various embodiments of the invention can map source images to destination images to compute term (or PolyMap) coefficients that can be used to dewarp images captured by a given lens. In numerous embodiments, mapping engines can map keypoints (including boundary keypoints) from a real source image to an ideal destination image to compute the term coefficients.

Output engines in accordance with several embodiments of the invention can provide a variety of outputs to a user, including (but not limited to) term coefficients, dewarped images, etc.

Although a specific example of an image capture calibration application is illustrated in this figure, any of a variety of image capture calibration applications can be utilized to perform processes for image capture calibration similar to those described herein as appropriate to the requirements of specific applications in accordance with embodiments of the invention.

Although specific methods of image capture calibration are discussed above, many different methods of image capture calibration can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for image capture calibration, the method comprising:
    identifying a set of real source keypoints from a real source image of a calibration pattern;
    computing a set of ideal source keypoints based on the set of real source keypoints;
    identifying ideal destination keypoints based on the ideal source keypoints;
    adding boundary keypoints to the set of real source keypoints and the set of ideal destination keypoints; and
    determining a set of term coefficients based on a mapping of the real source keypoints to the ideal destination keypoints.

2. The method of claim 1, wherein identifying the set of real source keypoints comprises capturing the real source image by:
    determining whether a calibration pattern is present in a first image;
    when the calibration pattern is present in the first image, identifying and evaluating a position of the calibration pattern within the source image;
    when the position of the calibration pattern meets a set of criteria, identifying the first image as the real source image.

3. The method of claim 2, wherein determining whether the calibration pattern is present in the first image comprises:
    identifying a plurality of regions of interest (ROIs);
    computing a histogram for each ROI of the plurality of ROIs; and
    determining that the calibration pattern is present when a strongly separated dense bimodal distribution is detected.

4. The method of claim 2, wherein identifying and evaluating a position of the calibration pattern comprises identifying an amount of at least one selected from the group consisting of skew, tilt, and centeredness.

5. The method of claim 1, wherein computing the set ideal source keypoints comprises:
   determining a scale for the source image;
   scaling coordinates for the set of real source keypoints based on the determined scale;
   determining a set of geodesics based on the scaled coordinates; and
   identifying intersects of the set of geodesics as ideal source keypoints.

6. The method of claim 5, wherein determining the scale for the source image comprises identifying a pixel distance from a center of the real source image to a 180° field of view (FOV), wherein scaling the coordinates for the set of real source keypoints comprises dividing the coordinates by the identified pixel distance.

7. The method of claim 5, wherein determining the set of geodesics comprises identifying geodesics along two axes, wherein each geodesic passes through a real source keypoint and a pair of points on a 180° field of view (FOV) boundary.

8. The method of claim 5, wherein identifying intersects comprises:
   identifying intersects in a first quadrant of the real source image; and
   reflecting the identified intersects of the first quadrant to at least one other quadrant.

9. The method of claim 1, wherein adding boundary points comprises:
   selecting a set of boundary points at a boundary of an equirectangular destination image for the destination keypoints; and
   identifying a corresponding set of boundary points at a 180° field of view (FOV) boundary for the real source keypoints.

10. The method of claim 9, wherein identifying a corresponding set of boundary points comprises performing a Reverse PolyMap operation with affine transformation.

11. A non-transitory machine readable medium containing processor instructions for image capture calibration, where execution of the instructions by a processor causes the processor to perform a process that comprises:
   identifying a set of real source keypoints from a real source image of a calibration pattern;
   computing a set of ideal source keypoints based on the set of real source keypoints;
   identifying ideal destination keypoints based on the ideal source keypoints;
   adding boundary keypoints to the set of real source keypoints and the set of ideal destination keypoints; and
   determining a set of term coefficients based on a mapping of the real source keypoints to the ideal destination keypoints.

12. The non-transitory machine readable medium of claim 11, wherein identifying the set of real source keypoints comprises capturing the real source image by:
   determining whether a calibration pattern is present in a first image;
   when the calibration pattern is present in the first image, identifying and evaluating a position of the calibration pattern within the source image;
   when the position of the calibration pattern meets a set of criteria, identifying the first image as the real source image.

13. The non-transitory machine readable medium of claim 12, wherein determining whether the calibration pattern is present in the first image comprises:
   identifying a plurality of regions of interest (ROIs);
   computing a histogram for each ROI of the plurality of ROIs; and
   determining that the calibration pattern is present when a strongly separated dense bimodal distribution is detected.

14. The non-transitory machine readable medium of claim 12, wherein identifying and evaluating a position of the calibration pattern comprises identifying an amount of at least one selected from the group consisting of skew, tilt, and centeredness.

15. The non-transitory machine readable medium of claim 11, wherein computing the set ideal source keypoints comprises:
   determining a scale for the source image;
   scaling coordinates for the set of real source keypoints based on the determined scale;
   determining a set of geodesics based on the scaled coordinates; and
   identifying intersects of the set of geodesics as ideal source keypoints.

16. The non-transitory machine readable medium of claim 15, wherein determining the scale for the source image comprises identifying a pixel distance from a center of the real source image to a 180° field of view (FOV), wherein scaling the coordinates for the set of real source keypoints comprises dividing the coordinates by the identified pixel distance.

17. The non-transitory machine readable medium of claim 15, wherein determining the set of geodesics comprises identifying geodesics along two axes, wherein each geodesic passes through a real source keypoint and a pair of points on a 180° field of view (FOV) boundary.

18. The non-transitory machine readable medium of claim 15, wherein identifying intersects comprises:
   identifying intersects in a first quadrant of the real source image; and
   reflecting the identified intersects of the first quadrant to at least one other quadrant.

19. The non-transitory machine readable medium of claim 11, wherein adding boundary points comprises:
   selecting a set of boundary points at a boundary of an equirectangular destination image for the destination keypoints; and
   identifying a corresponding set of boundary points at a 180° field of view (FOV) boundary for the real source keypoints.

20. The non-transitory machine readable medium of claim 19, wherein identifying a corresponding set of boundary points comprises performing a Reverse PolyMap operation with affine transformation.

\* \* \* \* \*